United States Patent
Linsky et al.

(10) Patent No.: US 11,849,064 B1
(45) Date of Patent: Dec. 19, 2023

(54) TECHNIQUES FOR DETECTING CALLING ANOMALIES IN INBOUND CALL TRAFFIC IN TELECOMMUNICATIONS NETWORKS

(71) Applicant: Bandwidth Inc., Raleigh, NC (US)

(72) Inventors: Dane Linsky, Raleigh, NC (US); Geoff Garrido, Raleigh, NC (US); Paul Washburn, Raleigh, NC (US)

(73) Assignee: Bandwidth Inc., Raleigh, NC (US)

( * ) Notice: Subject to any disclaimer, the term of this patent is extended or adjusted under 35 U.S.C. 154(b) by 0 days.

(21) Appl. No.: 18/367,196

(22) Filed: Sep. 12, 2023

(51) Int. Cl.
*H04M 3/22* (2006.01)

(52) U.S. Cl.
CPC ....... *H04M 3/2227* (2013.01); *H04M 3/2218* (2013.01)

(58) Field of Classification Search
CPC .......................... H04M 3/2227; H04M 3/2218
See application file for complete search history.

(56) References Cited

U.S. PATENT DOCUMENTS

| | | | |
|---|---|---|---|
| 11,050,878 B1 * | 6/2021 | Wicker | H04M 3/2218 |
| 11,418,642 B1 * | 8/2022 | Wicker | H04M 15/41 |
| 2013/0301810 A1 * | 11/2013 | Dunne | H04M 3/2227 379/32.01 |
| 2015/0319605 A1 * | 11/2015 | Gupta | H04M 3/085 455/405 |
| 2021/0099579 A1 * | 4/2021 | Vuppaladhadiam | H04M 7/1275 |

* cited by examiner

*Primary Examiner* — Solomon G Bezuayehu
(74) *Attorney, Agent, or Firm* — Stanek Lemon Crouse + Meeks; Gregory Stephens

(57) ABSTRACT

Methods identifying inbound call traffic anomalies in a telecommunications system are provided. The method includes receiving expected values for data related to the telecommunications system, the data being associated with call detail records; for each metric in the received data, determining if an observed value is outside defined upper and lower thresholds; selecting a set of residuals based on an aggregation of data in the call detail records if the observed value is outside the defined upper and lower thresholds; computing an anomaly score based the selected set of residuals; determining if multiple, serial anomalous alerting windows are needed to create an alert if the computed anomaly score is greater than a minimum anomaly score; and declaring that the data supports an anomaly in the inbound call traffic if it is determined that multiple, serial anomalous alerting windows are not needed to create an alert.

20 Claims, 18 Drawing Sheets

US 11,849,064 B1

TECHNIQUES FOR DETECTING CALLING ANOMALIES IN INBOUND CALL TRAFFIC IN TELECOMMUNICATIONS NETWORKS

FIELD

The present inventive concept generally relates to telecommunications networks and, more particularly, to determining anomalous events related to network telephony traffic.

BACKGROUND

Telecommunication carriers generally have contracts with customers that guarantee a specific level of service, i.e. Quality of Service (QoS). When the quality of service falls below a particular threshold, customers may look for new carriers that can provide the quality of service they generally require. Telecommunications networks are complex, and performance of the network may be affected by any number of activities in the network. For example, some telecommunication carriers provide features to reduce cost, but these features may inadvertently interfere with the level of service provided. In other words, "anomalies" may occur in the network that cause unforeseen problems. Thus, improved detection of anomalies in handling of calls and/or messages in telecommunications networks is desired.

SUMMARY

Some embodiments of the present inventive concept provide methods for identifying inbound call traffic anomalies in a telecommunications system. The method includes receiving expected values for data related to the telecommunications system, the data being associated with call detail records; for each metric in the received data, determining if an observed value is outside defined upper and lower thresholds; selecting a set of residuals based on an aggregation of data in the call detail records if the observed value is outside the defined upper and lower thresholds; computing an anomaly score based the selected set of residuals; determining if multiple, serial anomalous alerting windows are needed to create an alert if the computed anomaly score is greater than a minimum anomaly score; and declaring that the data supports an anomaly in the inbound call traffic if it is determined that multiple, serial anomalous alerting windows are not needed to create an alert.

In further embodiments, where it is determined that multiple, serial anomalous alerting windows are needed to create an alert, the method may further include obtaining a list of recent anomalies; extending the obtained list by a factor of 1; determining if a length of the extended list is greater than a number of serial, anomalous alerting windows needed to create an alert; and declaring that the data supports an anomaly in the inbound call traffic if it is determined that the extended list is greater than the number of serial, anomalous alerting windows needed to create an alert.

In still further embodiments, the method may further include obtaining six months of data for each metric aggregated into alerting windows; for each individual aggregation that has greater than 95 percent of all alerting windows with a non-zero amount of call detail records, preprocessing the data into a sequential format recognized by a model for each metric; forecasting one point ahead using a sequence leading up to a current alerting window; repeat forecasting until every time bin in the data has been forecasted; computing a difference between a forecasted point and an observed value for each alerting window; computing a standard deviation over a set of all computed differences; for each metric, computing an average of all standard deviations for tracked aggregations; collecting values for each tracked aggregation; and storing the values for use as residuals by the model.

In some embodiments, computing the anomaly score based the selected set of residuals may include obtaining scaled observed and middle values; obtaining residual for metric and tracked aggregation; determining if the observed value is below a lower boundary; setting an additive constant to −1.0 if the observed value is below the lower boundary and setting the additive constant to 0.3 if the observed value is greater than the lower boundary; computing the anomaly score based on the value of the additive constant; and returning an anomaly score of 100 if the computed score is greater than 100 and returning the computed score as the anomaly score if the computed score is less than 100.

In further embodiments, the defined upper and lower thresholds may include one or more of observed attempts>upper bound; observed attempts<lower bound; observed failures>upper bound; observed successes<lower bound; observed answer seizure ratio<lower bound; and observed minutes of usage<lower bound.

In still further embodiments, declaring that the data supports an anomaly in the inbound call traffic may be followed by creating an alert related to the anomaly.

In some embodiments, a remedial process associated with the alerted anomaly may be implemented.

In further embodiments, the expected value may correspond to at least one of a lower, middle and upper quantile of expected values.

Related systems and computers are also provided.

DETAILED DESCRIPTION OF EMBODIMENTS

Figure 1:
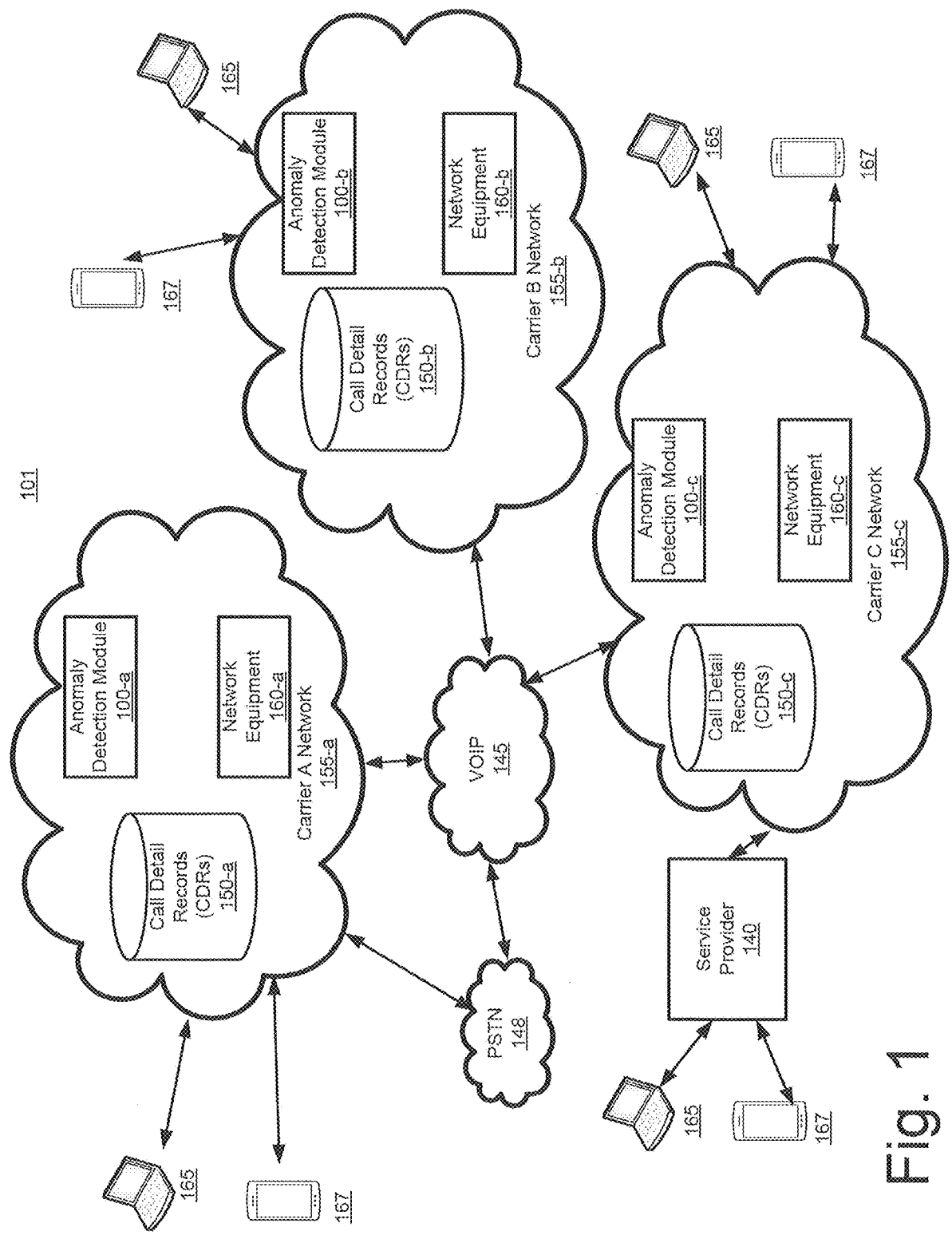
FIG. 1 is a block diagram illustrating a network including an anomaly detection module in accordance with some embodiments of the present inventive concept.

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

As discussed above, inadvertent anomalies that occur in a telecommunications network may affect call services. When telecommunication carriers do not sustain a guaranteed level of service, customers may look for other carriers. Thus, some embodiments of the present inventive concept are directed to detecting anomalies in the telecommunications network that may cause unforeseen decreases in the quality of service provided to a customer. In particular, some embodiments of the present inventive concept are directed to anomalies located by analyzing details associated with calls made in the telecommunications network (call data) as will be discussed further herein.

As used herein, an "anomaly" refers to a deviation from what is standard, normal, or expected. In other words, an anomaly may be an observed value which has been determined to be related to detecting a specified anomalous condition, for example, missing inbound traffic. In accordance with embodiments discussed herein, anomalies may be detected in any type of network traffic without departing from the scope of the present inventive concept. For example, anomalies may be detected in outbound or inbound voice tollfree/long distance/international traffic that may cause calls to/from customers to not complete in a network, i.e. a service provider's network, a customer's network, a destination network a source network and the like.

It will be understood that there are different types of anomalies. For example, "threshold anomalies" and "contextual anomalies." As used herein, a "threshold anomaly" refers to an anomaly that is defined solely based on a value crossing over some chosen threshold. For example, if for a given time interval (e.g. hour of time), an average length of calls (ALOC) for a particular Customer A drops below 20 minutes, this hour of time (time interval) represents an anomaly. In this example, the arbitrary value of 20 minutes is chosen as the threshold beforehand. In other words, the threshold of 20 minutes is predefined. A "contextual anomaly," on the other hand, refers to an anomaly that is defined partially based on "contextual" information, such as a time of day, or when compared to other data points. Thus, rather than an arbitrary threshold, the context of when the calls are made or where the calls are made from may be taken into account. Contextual anomalies may be further separated into time series based anomalies and non-time series based anomalies.

"Time series based contextual anomalies" refer to anomalies defined relative to time. For example, if the ALOC drops below 20 minutes (threshold) for Customer A at 4:00 AM, it may not be considered an anomaly if calls in the early morning tend to be shorter than calls made later in the day. However, if the ALOC drops below 20 minutes at 11:00 AM, it may be considered an anomaly as calls made during the daytime hours tend to last longer. Thus, the context of the call being made at 4:00 AM versus 11:00 AM can affect whether the situation is considered an anomaly. It will be understood that this example uses both a threshold of 20 minutes and a time component, but a time component is used to fully define a time series anomaly.

"Non-time Series based contextual anomalies" refer to anomalies that are partially defined based on contextual information other than time. For example, if 100 calls from Raleigh to Denver disconnect at exactly 3:13:07 PM, and sixty five percent of these calls appear to be redialed, this represents a potential call drop anomaly, likely due to a technical issue, such as a fiber optic cable cut or the like. This anomaly is partially defined based on time, i.e. all of the calls end at the same time, but is also defined based on a non-time based factor, i.e. the redial percentage.

It will be understood that the additional dimension of "redial percentage" helps to determine if this is an anomaly worth investigating. For example, if the redial percentage is only five percent, an assumption may be made that this was just a large conference call ending, and there may be nothing anomalous worth investigating. However, a larger redial percentage of sixty five percent indicates that the call was ended prematurely.

Embodiments of the present inventive concept may enable detection of anomalies on a network/carrier device. For example, call failure anomalies may include inbound calls not received due to a network misconfiguration; major, unexpected traffic migrations (e.g. traffic is redirected from Carrier A (expected) to Carrier B); network congestion/capacity limits; hardware failures in a carrier or service provider's network in both destination and source networks; and many other issue types.

Some embodiments of the present inventive concept may be discussed in reference to detecting a large influx of calls inbound calls to a toll-free number. For example, a large influx of toll free originated calls in to a call center (customer call center) related to financial or healthcare industries with high volumes of calls. Embodiments of the present inventive concept may be used to detect if this large influx of calls coming in to the call center is leading to call failures. These call centers are generally very large and the ability to know when there is a large influx of bad traffic to these call centers would be very useful. In other words, embodiments of the present inventive concept can be used to detect the initial anomaly and troubleshoot the resulting problems caused thereby.

It will be understood that although embodiments discussed herein relate to detection of an anomaly related to a large influx of toll-free calls, embodiments of the present inventive concept are not limited to the specific data and metrics discussed herein. The methods discussed herein can be used with any call record data without departing from the scope of the present inventive concept.

Referring now to FIG. 1, a block diagram illustrating an example system 101 according to some embodiments of the present inventive concept will be discussed. As illustrated, the system 101 includes a voice over internet protocol (VoIP) network 145; a public switched telephone network (PSTN) 148; a plurality of carrier networks, for example, Carrier A Network 155-*a*, Carrier B Network 155-*b* and Carrier C Network 155-*c*; a service provider 140 and a plurality of endpoints 165 and 167 in communication with the Carrier Networks 155-*a*, 155-*b* and 155-*c* and the service provider 140 in accordance with some embodiments discussed herein. Although only three Carriers are illustrated in FIG. 1, it will be understood that less or more than three Carriers may be present in the system without departing from the scope of the present inventive concept.

The VoIP network 145 is provided by a group of technologies and is a method for the delivery of voice communications and multimedia sessions over Internet Protocol (IP) networks, such as the Internet. The terms Internet telephony, broadband telephony, and broadband phone service specifically refer to the provisioning of communications services (voice, facsimile, short message service (SMS), voice-messaging and the like) over the Internet, rather than via the PSTN. The PSTN network 148 is an aggregate of the world's circuit-switched telephone networks that are operated by national, regional, or local telephony operators, providing infrastructure and services for public telecommunication. The network 145 may be any combination of wired and/or wireless networks, including without limitation a direct interconnection, secured custom connection, private network (e.g., an enterprise intranet), public network (e.g., the Internet), personal area network (PAN), local area network (LAN), metropolitan area network (MAN), operating missions as nodes on the Internet (OMNI), wireless area network (WAN), wireless network (e.g., 802.11 WiFi), cellular network, and other communications networks.

The plurality of endpoints may include an internet of things (IoT) endpoint 165 and/or a telephony endpoint 167. The IoT endpoint may include an end user device such as a personal computer (PC), security system or component, heating, ventilation, and air conditioning (HVAC) system or component, automotive device, audio device, smart refrigerator, smart stove, smart television, and the like. The telephony endpoint 167 may be a mobile device such as cell phone, smartphone, laptop, VoIP phone, IoT device, or another telephonic device. The endpoints 165 and 167 communicate through the networks 145 and 148 and the Carriers 155-*a*, 155-*b* and 155-*c*.

Figure 11:
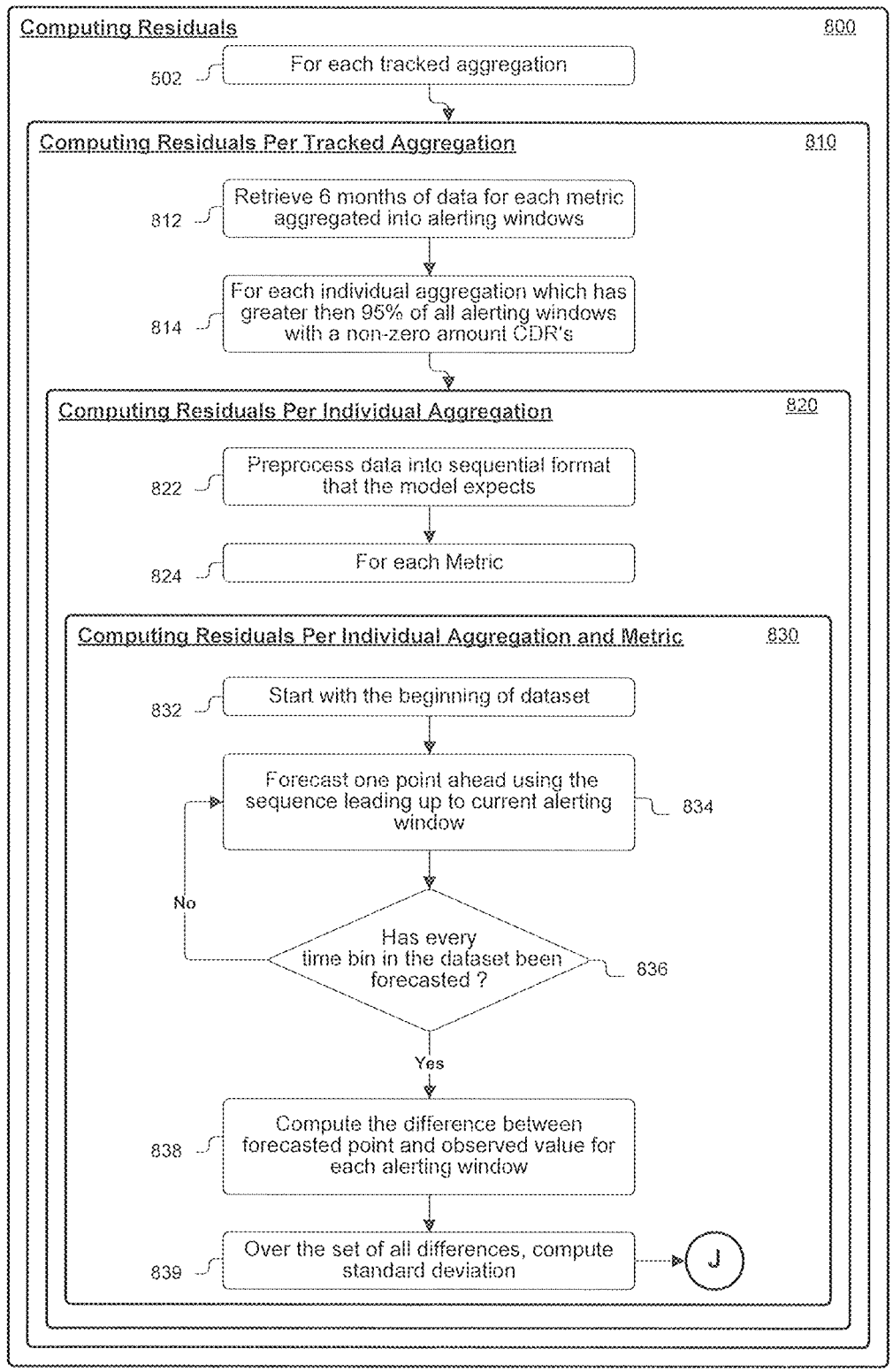
FIG. 11 is a flowchart illustrating operations for computing residuals in accordance with various embodiments of the present inventive concept.

As further illustrated in FIG. 11, each Carrier network 155-*a*, 155*b* and 155-*c* may include call detail records (CDR) 150-*a*, 150-*b* and 150-*c*; network equipment 160-*a*, 160-*b* and 160-*c*; an anomaly detection module 100-*a*, 100-*b* and 100-*c* and an RCA module 102-*a*, 102-*b* and 102-*c*, respectively, in accordance with embodiments discussed herein. The network equipment 160-*a*, 160-*b* and 160-*c* may illustrate any hardware used to send, receive, and route calls at the Carrier Network 155-*a*, 155-*b* and 155-*c*.

The anomaly detection module 100-*a*, 100-*b* and 100-*c* may provide methods, systems and computer program products for detecting anomalies in the telecommunications network and informs the telecommunications Carrier 155-*a*, 155-*b* and 155-*c* of these anomalies such that the carriers may address the same. As used herein, the term a "telecommunications carrier" may refer to any provider of telecommunications services. FIG. 1 also includes a service provider 140. It will be understood that a carrier, such as Carrier A, B and C in FIG. 1 may be a service provider, for example, Bandwidth, Verizon, AT&T and the like. However, the reverse is not true, a service provider 140 is not necessarily a carrier. In embodiments where the service provider 140 is not a carrier, the service provider 140 may be a customer of the Carrier. FIG. 1 illustrates, the service provider 140 being a customer of Carrier C 155-c. It will be understood that although the service provider 140 is shown as only being a customer of Carrier C 155-c, embodiments of the present inventive concept are not limited thereto. The service provider 140 may be customer of other Carriers or there may be additional service providers in the system 101 without departing from the scope of the present inventive concept.

Referring again to FIG. 1, anomaly detection module 100-a, 100-b and 100-c has access to CDRs 150-a, 150-b and 150-c. The anomaly detection module 100-a, 100-b and 100-c may have direct access to the CDRs 150-a, 150-b and 150-c, in fact, the CDRs 150-a, 150-b and 150-c may be part of the anomaly detection module 100-a, 100-b and 100-c in some embodiments. However, the CDRs 150-a, 150-b and 150-c may be separate from the anomaly detection module 100-a, 100-b and 100-c.

As used herein, a "CDR" is a record of a transaction of an individual call across a network. The CDRs 150-a, 150-b and 150-c represent a database including many CDRs. The anomaly detection module 100 use the CDRs in the database 150-a, 150-b, 150-c to determine information about the network, for example, has an anomaly been detected and, if so, how to we address in. A single CDR represents a single set of fields associated with a single transaction (call) in these datasets. An example CDR including example data fields that may be used in accordance with some embodiments of the present inventive concept are discussed below with respect to FIG. 2. However, a CDR may include additional fields or fewer fields based on the anomaly being detected.

Figure 2:
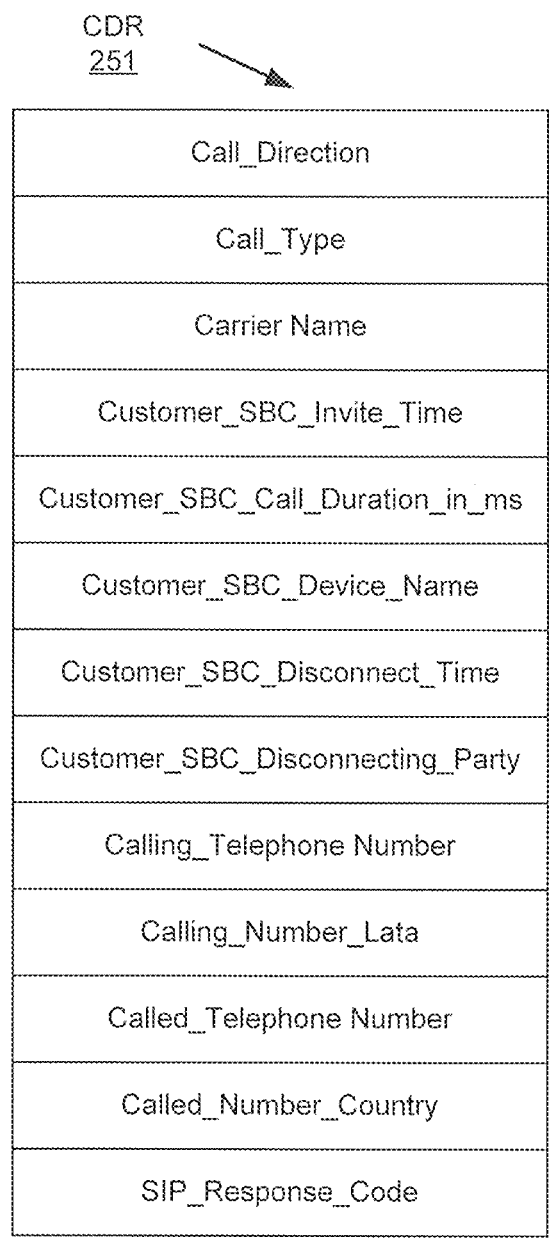
FIG. 2 is a block diagram illustrating fields in an example call detail record (CDR) in accordance with some embodiments of the present inventive concept.

Referring to FIG. 2, a diagram illustrating example fields in a CDR will be discussed. The CDR databases 150-a, 150-b and 150-c illustrated in FIG. 1 will be referred to herein collectively as "CDR database 150." As illustrated, each CDR 251 in the CDR database 150 may include the following example fields: call_direction; call_type; carrier_name; customer_sbc_invite_time; customer_sbc_answer_time; customer_sbc_call_duration_in_milliseconds (ms); customer_sbc_device_name; customer_sbc_disconnect_time; customer_sbc_disconnecting_party; calling_number; calling_number_lata; called_number; called_number_country; and sip_reponse_code. Each field will be discussed below.

The call_direction refers to the direction of a call, from the service provider's perspective, for example, inbound or outbound calls. The call-type refers to the "type" of a call, as defined by the service provided. For example, call types may coordinate with product offerings and have different technical components. Common call types include emergency; international; international-internal; interstate; intrastate; local; tollfree-in and the like. The carrier name refers to a telecommunications provider. As used herein, "carrier" or "carrier name" refers to a telecommunications provider that receives the call from the network 145/148 first, i.e. the carrier that immediately receives the traffic, not any other intervening provider. For example, if a customer sends outbound international traffic to the network, the network might send this traffic to Carrier A 155-a who then might send it to Carrier B 155-b and so on. Thus, the only known carrier information is the first Carrier to receive the data. Thus, all carriers in the flow may not be known. Similarly, for inbound calls, the carrier_name field may represent the carrier that passed the call to the provider. For example, Carrier A might send a call to the provider, who then might send the call to a customer. The carrier_name field here would be "Carrier A".

The customer_sbc_*_time fields, customer_sbc_invite_time, customer_sbc_answer_time and customer_sbc_disconnect_time are all fields in the CDR 251 that represent different timestamps associated with a single call, from the perspective of the network's session border controller (SBC) assigned to a particular customer. These fields are time stamps that indicate when the call invite happened and when the call was disconnected, respectively. It will be understood that other time fields may be present without departing from the scope of the present inventive concept.

The customer_sbc_device_name is a CDR field that represents the SBC on the customer edge that a call flows through. The SBC is a physical hardware device with special installed software that manages call flows in real time. A service provider may manage hundreds of SBCs distributed throughout the world.

The customer_sbc_disconnecting_party field indicates which side of the call terminated (ended) the call. For example, for outbound calls, a value of 1 in this field may indicate that the calling party ended the call, and a value of 2 in this field may indicate that the called party ended the call. A value of 0 is rare and indicates that a technical issue ended the call. This method is provided as an example only and other methods may also be used. In some embodiments, the disconnecting party is equivalent to which party sends a session initiation protocol (SIP) BYE direction. SIP is a protocol used in VoIP communications that allows users to make voice and video calls. A SIP BYE is a SIP request used to terminate a session.

The calling telephone number field includes the phone number of the calling party and the called telephone number field includes the phone number of the called party. The calling_number_lata field is the LATA from where the call was made. LATA refers to a federally defined geographical area. The called_number_country field includes the country where the called number is located.

The sip_response_code is a CDR field representing a final SIP response code of a call. Typical values may include 200, 403, 404, 486, 487, 503 and 550, although dozens of possible values exist. For example, a value of 200 indicates a call ended successfully, while other values indicate a call ended with particular errors. As discussed above, the CDR 251 of FIG. 2 is not an exhaustive list of CDR fields, but is provided as an example to allow discussion of a use case herein.

Figure 3:
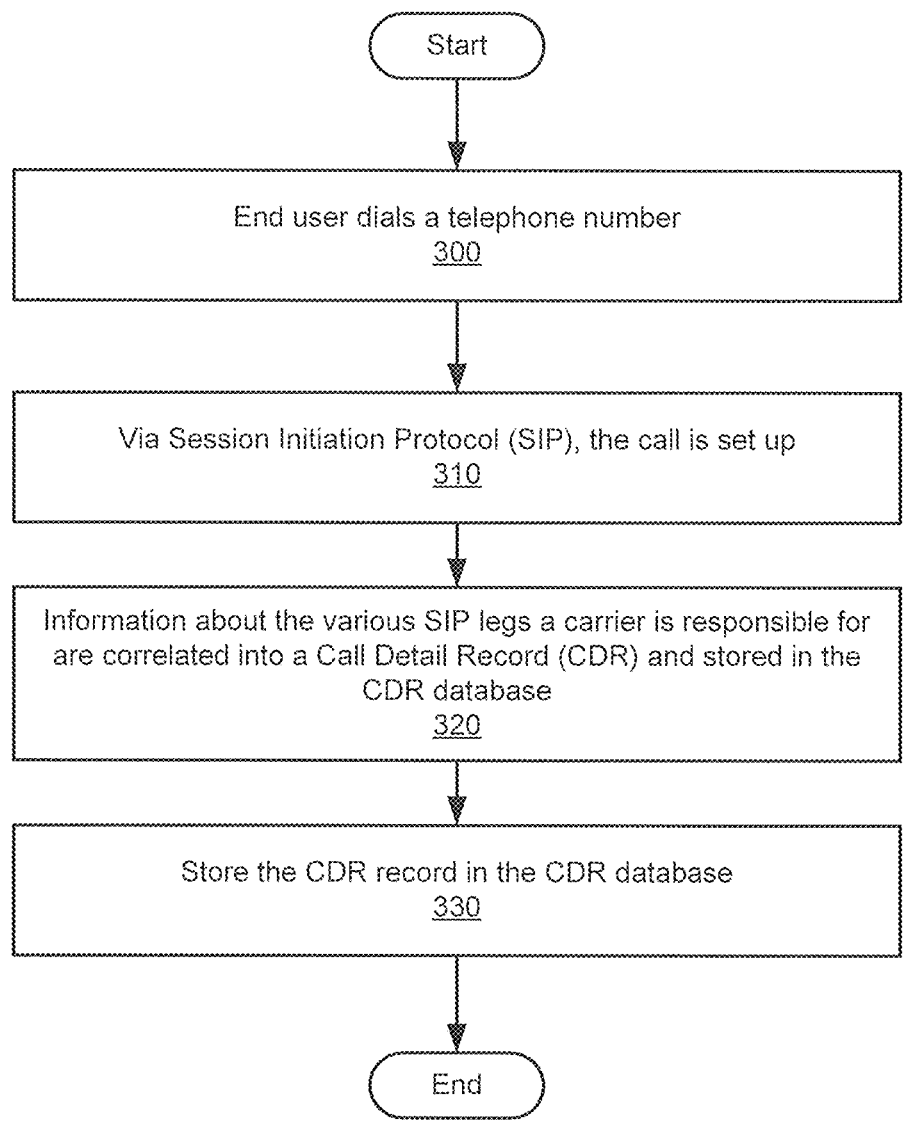
FIG. 3 is a flowchart illustrating operations for initiating a call and storing details thereof in a CDR in accordance with some embodiments of the present inventive concept.

Referring now to the flowchart of FIG. 3, an example of operations for beginning a call and storing the call details in a CDR 251 will be discussed. As illustrated in FIG. 3, operations begin at block 300 by an end user having the calling_number dial the called_number. In the conference call example, the end user dials a conferencing enabled telephone number, which creates the conference call. Via SIP, the call, for example, the conference call, may be set up (block 310). The various SIP legs used to set up and complete the call typically traverse multiple "carriers." Information about the individual SIP legs a single carrier is responsible for are correlated into the CDR 251 (block 320). The CDR 251 is then stored in the CDR database 150 (block 330). The operations illustrated in FIG. 3 may be performed on an ongoing basis as calls are made. The flowchart of FIG. 3 is provided as an example only and, thus, it is understood that CDRs can be created using different operations.

Although embodiments of the present inventive concept are discussed herein with respect to SIP calls, it will be understood that embodiments of the present inventive concept are not limited thereto. For example, embodiments discussed herein can be used for HTTP calls. The methods and systems discussed herein receive correlated CDRs with the correct fields and time ranges, process these fields as discussed herein and return a result. The methods and systems discussed herein are indifferent to how the call happened, or the technical details needed to actually create the correlated CDR.

Various details with respect to anomaly detection in accordance with embodiments discussed herein will now be discussed below with respect to FIGS. 4 through 14. However, before discussing details of the present inventive concept, many terms used throughout this specification will be defined.

As used herein "aggregation" refers to the collection of information created by bringing groups of CDRs together based on one or multiple shared aggregation fields. For example, the aggregation "carrier by call direction" may represent all relevant CDR data aggregated by shared carrier and call direction.

"Tracked aggregation" refers to an aggregation that is relevant to detecting the anomaly, e.g. missing inbound traffic. "Individual aggregation" refers to a set of CDRs which share all aggregation fields within a tracked aggregation.

"Aggregation field" refers to a categorical piece of information utilized to aggregate CDRs, such as data center, carrier, and the like. "Alerting configuration refers to a set of configuration data which defines the requirements for an "alert" to be generated, including minimums for anomaly score and call volume. An "alert" can be visual, audible or a combination thereof without departing from the scope of the present inventive concept.

An "alerting window" refers to a fixed size time window which the metrics of individual aggregations are evaluated on to potentially generate an anomaly alert. For example, the alerting window may be defined by a start time and an end time. An anomalous alerting window refers to an alerting window which has been determined to contain an anomaly.

An "alert payload" refers to a platform-specific set of information necessary to facilitate communication with external platforms to generate an alert. As discussed above, an "anomaly" refers to an observed value which has been determined to be related to detecting a specified anomalous condition (e.g., missing inbound traffic).

An "anomaly score" refers to a numeric representation of the model's confidence that an alerting window is an anomalous alerting window. As discussed above, a "CDR" is a Call Detail Record that includes a record of statistics about a single call that occurred across a network. As discussed with respect to FIG. 2, CDRs may include information such as call duration, if the call connected successfully, any network devices the call occurred over, location information on the caller and called phone numbers, etc.

"Lower quantile" refers to the 10% quantile of expected values for a specific aggregation and metric. "Middle quantile" refers to the 50% quantile of expected values for a specific aggregation and metric. "Upper quantile" refers to the 98% quantile of expected values for a specific aggregation and metric.

Metric refers to an aggregate function applied to an individual aggregation which provides a measure of call health within that individual aggregation for a particular time window. "Metric dependencies" refers to the set of dependencies which must be upheld between metrics which are derived from other metrics.

A "minimum anomaly score" refers to a pre-determined anomaly score value which anomalies must exceed to generate an alert.

A "model" refers to a machine learning model which takes a sequence as input and produces a lower, middle, and upper prediction for all metrics in that sequence. Example machine learning models that may be used in accordance with embodiments discussed herein include Long Short Term Memory (LSTM) neural networks and Dynamic Generalized Linear Models (DGLM). However, it will be understood that embodiments of the present inventive concept are not limited to these examples.

An "observed value" refers to the value observed for an individual aggregation and metric for the current alerting window. A "payload" refers to a structured set of information used to facilitate communication between the streaming platform and the model. An "alert payload" refers to a platform specific set of information necessary to facilitate communication with external platforms to generate an alert. "Residuals" refer to a numerical estimate of model confidence for a tracked aggregation.

"Scaled" refers to a metric data which has been transformed and normalized to the interval [0,1] using the associated scaler. A "scaler" refers to the minimum and maximum values observed over the last seven days for a particular metric and individual aggregation. A "scaler file" refers to a file containing the scalers for all tracked aggregations.

A "sequence" refers to a collection of the values for each metric for the last, for example, 48, alerting windows for an individual aggregation, used as input to the model. A "tracked aggregation" refers to an aggregation that is relevant to detecting a specified anomalous condition (e.g., missing inbound traffic). A "unique identification key" is a string that uniquely identifies an individual aggregation, for example, "vce;call_direction_outbound; carrier_id_9".

Various details of embodiments of the present inventive concept will be discussed utilizing the definitions set out above. A data analytics anomaly detection module discussed herein provides anomaly detection in a telecommunications network by subjecting the network data pertaining to telephone calls (for example, data stored in the CDRs) to one or more data analysis models. For example, an example flow may be as follows: a streaming platform may be used as input for a data analytics model; scalers may be defined and generated; using the scalers the model may be loaded and used to detect anomalies; residuals may be computed as well as an anomaly score. Once all steps have been performed, the score is communicated back to the streaming platform where an alert may be generated. The generation of the alert may cause one or more engineers to review the detected anomaly and possibly commence troubleshooting associated therewith as will be discussed further below with respect to FIGS. 4 through 14.

Figure 4:
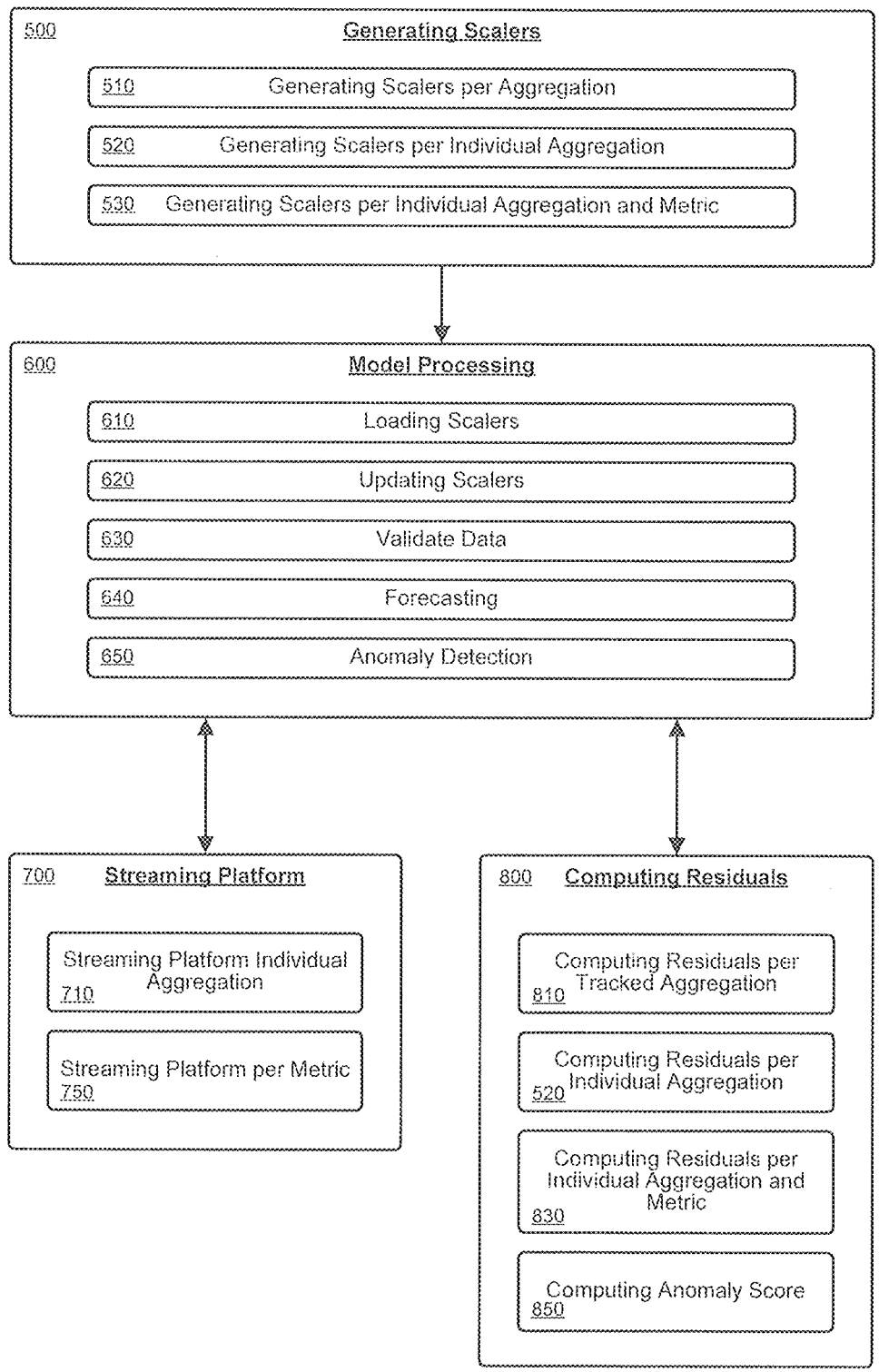
FIG. 4 is a diagram illustrating a functional flow in accordance with some embodiments of the present inventive concept.

FIG. 4 is a diagram illustrating a functional flow 400 in accordance with some embodiments of the present inventive concept. The embodiments described herein may be described along four (4) functional concepts. The four functional concepts are scaler generation 500, model processing 600, a streaming platform 700, and computing residuals 800.

As illustrated in FIG. 4, the scaler generation function 500 comprises various sub-functions including generating scalers per aggregation 510, generating scalers per individual aggregation 520, and generating scalers per individual aggregation and metric 530. As discussed above, a scaler refers to the minimum and maximum values observed over the last seven days of a particular metric and individual aggregation. The scaler generation function 500 broadly refers to the gathering, organizing, and preparing of data to be used in the model processing function 600.

It will be understood that although the minimum and maximum values observed herein are for the last seven days, embodiments of the present inventive concept are not limited thereto. A scaler can be defined for less than or more than seven days without departing from the scope of the present inventive concept.

The first scaler generation sub-function, generating scalers per aggregation 510, generally refers to generating the list of minimum and maximum values observed over the last seven days for each aggregation, i.e. for each collection of information created by bring groups of CDRs together based on one or more multiple shared aggregation fields. For example, the aggregation "carrier by call direction" represents all relevant CDR data aggregated by shared carrier and call direction.

The second scaler generation sub-function, generating scalers per individual aggregation 520, generally refers to generating the list of minimum and maximum values observed over the last seven days for each individual aggregation, i.e. for each set of CDRs that share all aggregation fields with a tracked aggregation, i.e. an aggregation that is relevant to detecting the relevant anomaly, e.g. missing inbound traffic.

Finally, the third scaler generation sub-function, generating scalers per individual aggregation and metric 530, generally refers to generating the list of minimum and maximum values observed over the last seven days for each individual aggregation, i.e. for each set of CDRs that share all aggregation fields with a tracked aggregation. An aggregate function is applied to each individual aggregation to provide a measure of call health within the individual aggregation for a particular time window (metric). Details with respect to each of these three sub-functions will be discussed below with respect to FIG. 5.

Once the scaler generation function 500 discussed above with respect to FIG. 5 is complete, operations proceed to the model processing function 600. As illustrated the model processing function 600 includes, for example, five (5) sub-functions including loading scalers 610, updating scalers 620, validating data 630, forecasting 640, and anomaly detection 650.

The first model processing sub-function, loading scalers 710, generally refers to loading the generated scalers discussed above with respect to FIG. 5 into the selected machine learning model. As discussed above, there are many types of machine learning models and embodiments of the present inventive concept are not limited to any one in particular.

The second model processing sub-function, loading scalers 620, generally refers to updating the details with respect to the current scaler files loaded into the model. The third model processing sub-function, validating data 630, generally refers to checking the loaded scalers to ensure the information associated therewith is correct.

The fourth model processing sub-function, forecasting 640, generally refers to comparing values to thresholds and adjusting the values accordingly. Finally, the fifth model processing sub-function, anomaly detection 650, generally refers to performing an anomaly detection algorithm for each metric. Details with respect to each of the five sub-functions of the model processing function 600 will be discussed below with respect to FIGS. 7-9.

It will be understood that although the model processing function 600 only includes five sub-functions in FIG. 4, embodiments of the present inventive concept are not limited thereto, sub-functions can be combined or further separated without departing from the scope of the present inventive concept.

As further illustrated in FIG. 4, the streaming platform function 700 comprises sub-functions including streaming platform pertaining to individual aggregation 710 and streaming platform per metric 750. The first streaming platform sub-function, streaming platform pertaining to individual aggregation 710, generally refers to preparing the payload related to the individual aggregation for the model processing. The second streaming platform sub-function, streaming platform per metric 750, generally refers to an aggregate function applied to the individual aggregation which provides a measure of call health within that individual aggregation for a particular time window. Further details with respect to the streaming platform function 700 will be discussed further below with respect to FIG. 6

Finally, as illustrated in FIG. 4, the computing residuals function 800 includes, for example, sub-functions including computing residuals per tracked aggregation 810, computing residuals per individual aggregation 820, computing residuals per individual aggregation and metric 830, and computing anomaly score 850. As discussed above, residuals are a numerical estimate of model confidence. Thus, computing residuals per tracked aggregation 810, generally refers to a numerical estimate of model confidence for tracked aggregation. Similarly, computing residuals per individual aggregation 820, a numerical estimate of model confidence for individual aggregation. Computing residuals per individual aggregation and metric 830, generally refers to an aggregate function applied to the individual aggregation which provides a measure of call health within that individual aggregation for a particular time window. Finally, computing anomaly score 850, generally refers to generating an anomaly score from all the data. Further details with respect to the computing residuals function 800 will be discussed further below with respect to FIGS. 11-12.

Figure 5:
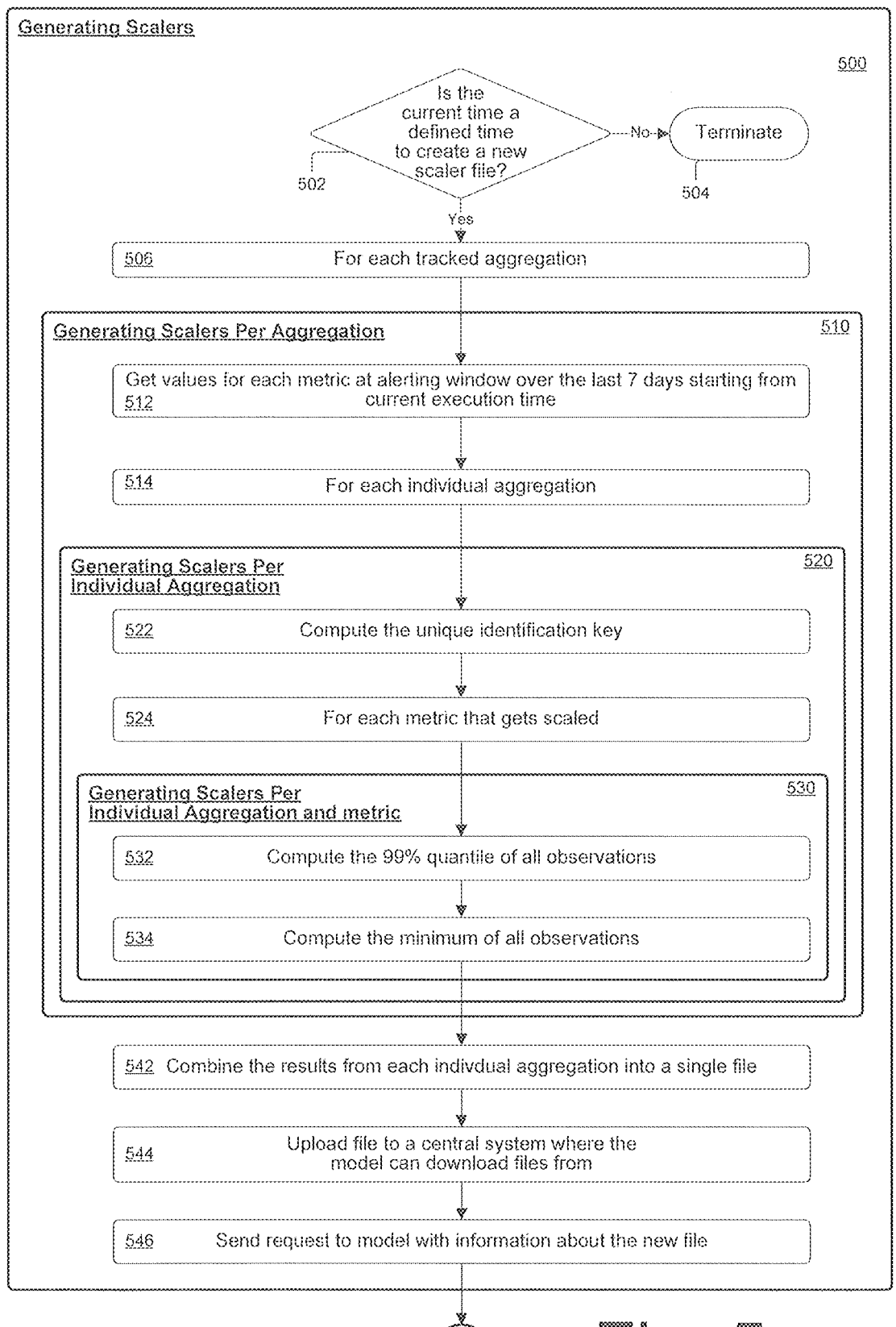
FIG. 5 is a flowchart illustrating operations for generating scalers in accordance with various embodiments of the present inventive concept.

Referring now to FIG. 5, a flowchart illustrating more detailed operations for generating scalers 500 in accordance with various embodiments of the present inventive concept will be discussed. As illustrated in FIG. 5, operations begin at block 502 by determining if the current time is a defined time to create new scaler files. If it is determined not to be a defined time to create new scaler files, operations proceed to block 504 and terminate. If, on the other hand, it is determined the current time is a defined time to create new scalers (block 502), operations proceed to block 506 where scalers are created for each tracked aggregation.

Details of generation of scalers will be discussed below with respect to FIG. 5, however, note that sub-function 510 includes operations of blocks 512 and 514, sub-function 520 includes operations of blocks 522 and 524 and sub-function 530 includes operations of blocks 532 and 534. It will be understood that blocks may be combined and/or expanded without departing from the scope of the present inventive concept.

Operations proceed from block 514 by obtaining values for each metric at an alerting window over the proceeding seven days beginning at the current execution time (block 512). It will be understood that embodiments discussed herein are not limited to a 7 day window. For each individual aggregation (block 514) compute a unique identification key (block 522) for each metric that gets scaled (block 524). As used herein, a "unique identification key" refers to a string of punctuation delimited words describing the individual aggregation. For example, a piece of information (such as a scaler), i.e. call_direction_outbound;carrier_id_1.

A 99 percent quantile (upper quantile) is generated/computed for all observations (block 532). As discussed above, the 99 quantile represents the 99 percent of expected values for a specific aggregation and metric. A minimum for all observations is also computed (block 534).

The results of each individual aggregation are combined into a single file (block 542). These files may be communicated (uploaded) to a central location that is accessible by the model (block 544). For example, the files may be uploaded into a central location and the model can download the file therefrom. The scaler generation function 500 may then send a request to the model with the information about the newly created file (block 546). As indicated by the circled letter A operations proceed to downloading the newly created file into the model (block 612 of FIG. 7), details thereof will be discussed with respect to FIG. 7.

Figure 6:
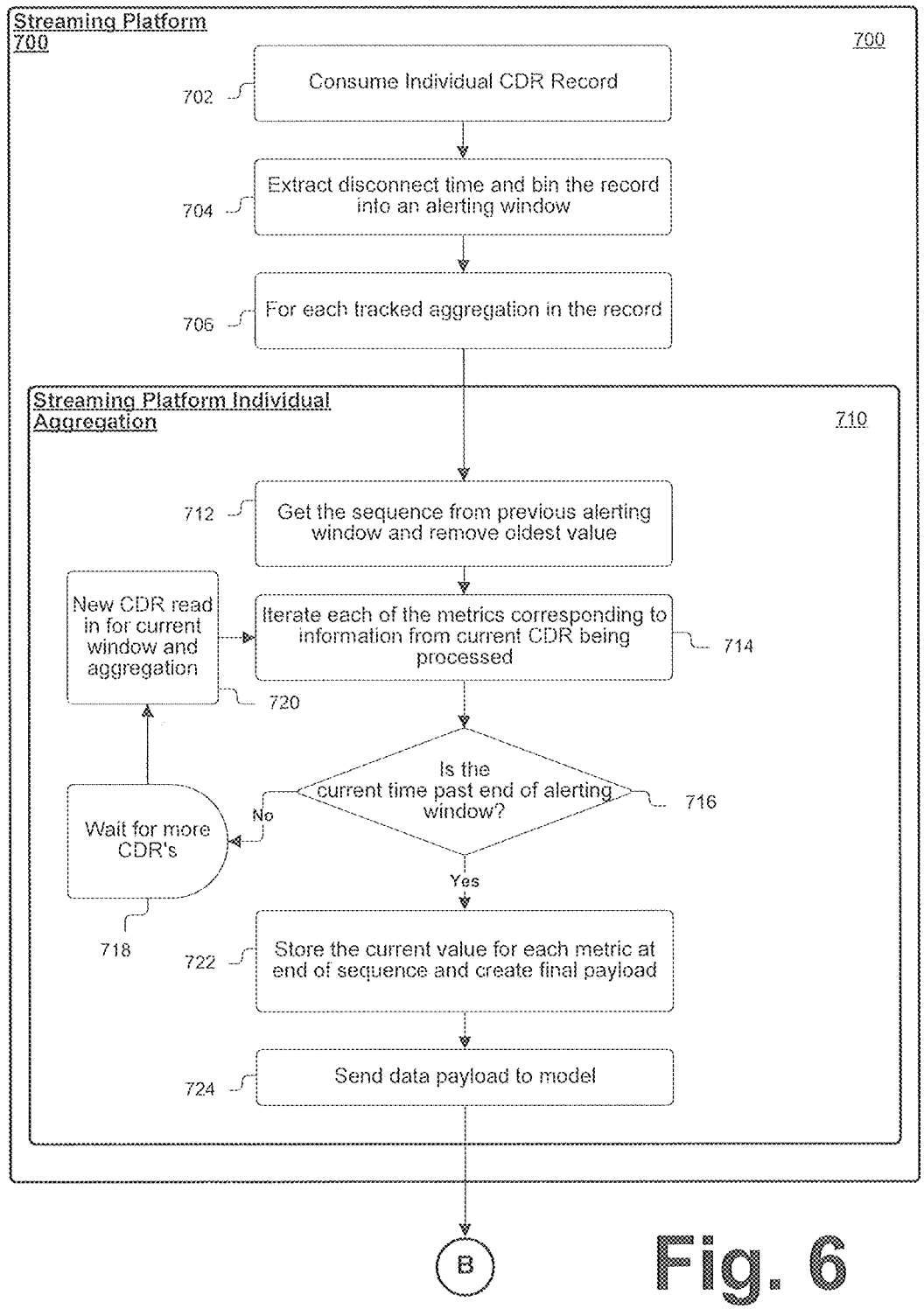
FIG. 6 is a flowchart illustrating operations for a streaming platform for acquiring data to be used by the analytics models in accordance with various embodiments of the present inventive concept.

Referring now to FIG. 6, a flowchart illustrating operations for the streaming platform 700 of FIG. 4 for acquiring data to be used by the analytics models in accordance with various embodiments of the present inventive concept will be discussed. As illustrated, operations of the streaming function 700 begin at block 702 by consuming individual CDR records. An example CDR is illustrated in FIG. 2 and the details thereof are discussed therewith. As stated above, embodiments of the present inventive concept are not limited to the fields included in the CDR of FIG. 2. A disconnect time is extracted from the consumed CRD record and stored into an alerting window (block 704) for each tracked aggregation in the record (block 706).

Operations proceed to block 712 obtain the sequence from a previous alerting window and remove the oldest value. Iterate each of the metrics corresponding to information from current CDRs being processed (block 714). It is determined if the current time is past an end of the alerting window (block 716). If it is determined that the current time is not past the end of the alerting window, operations proceed to block 718 to wait for more CDRs. A new CDR is read during the current window and aggregation and operations of blocks 714 through 720 repeat until it is determined that the current time is past the end of the alerting window (block 716).

Once it is determined that the current time is past the end of the alerting window (block 716), operations proceed to block 722 where the current value for each metric is stored to create a final payload for this alerting window. The payload is then sent to the model upon request (block 724), which will be discussed further with respect to FIG. 7 at circled letter B.

Figure 7:
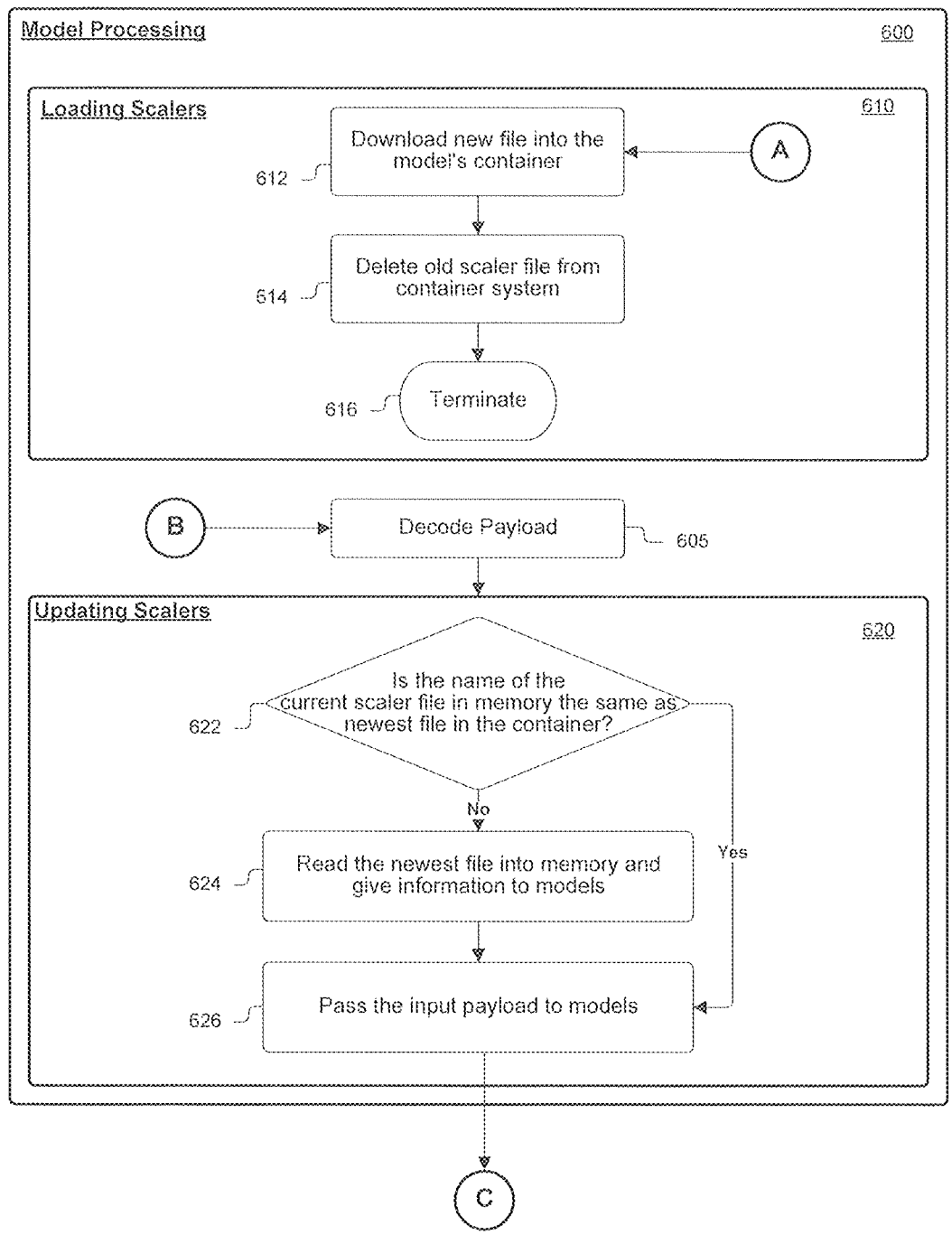
FIG. 7 is a flowchart illustrating operations for loading and updating scalers sub-functions within the model processing function in accordance with various embodiments of the present inventive concept.

Referring now to FIG. 7, a flowchart illustrating operations for loading and updating scalers sub-functions within the model processing function in accordance with various embodiments of the present inventive concept will be discussed. As illustrated, operations of the model function 600 proceed from block 546 (A-A) by downloading the new file from the central location (block 612) and deleting an old scaler file from the system (block 614). Once the scalers are loaded, the loading scalers subfunction 610 terminates (block 616).

Model processing operations continue by decoding the payload from block 724 (B-B) at block 605. It is determined if the name of the current scaler file stored in memory is the same as the newest file in the container (block 622). If the name of the current scaler file is the same, operations proceed to pass the input payload to the models (block 626).

However, if the name of the current scaler file is not the same as the newest file (block 622), operations proceed to block 624 where the newest file is read into memory and this information is passed to the models. Then, operations proceed to block 626 where the input payload is passed to the models.

Figure 8:
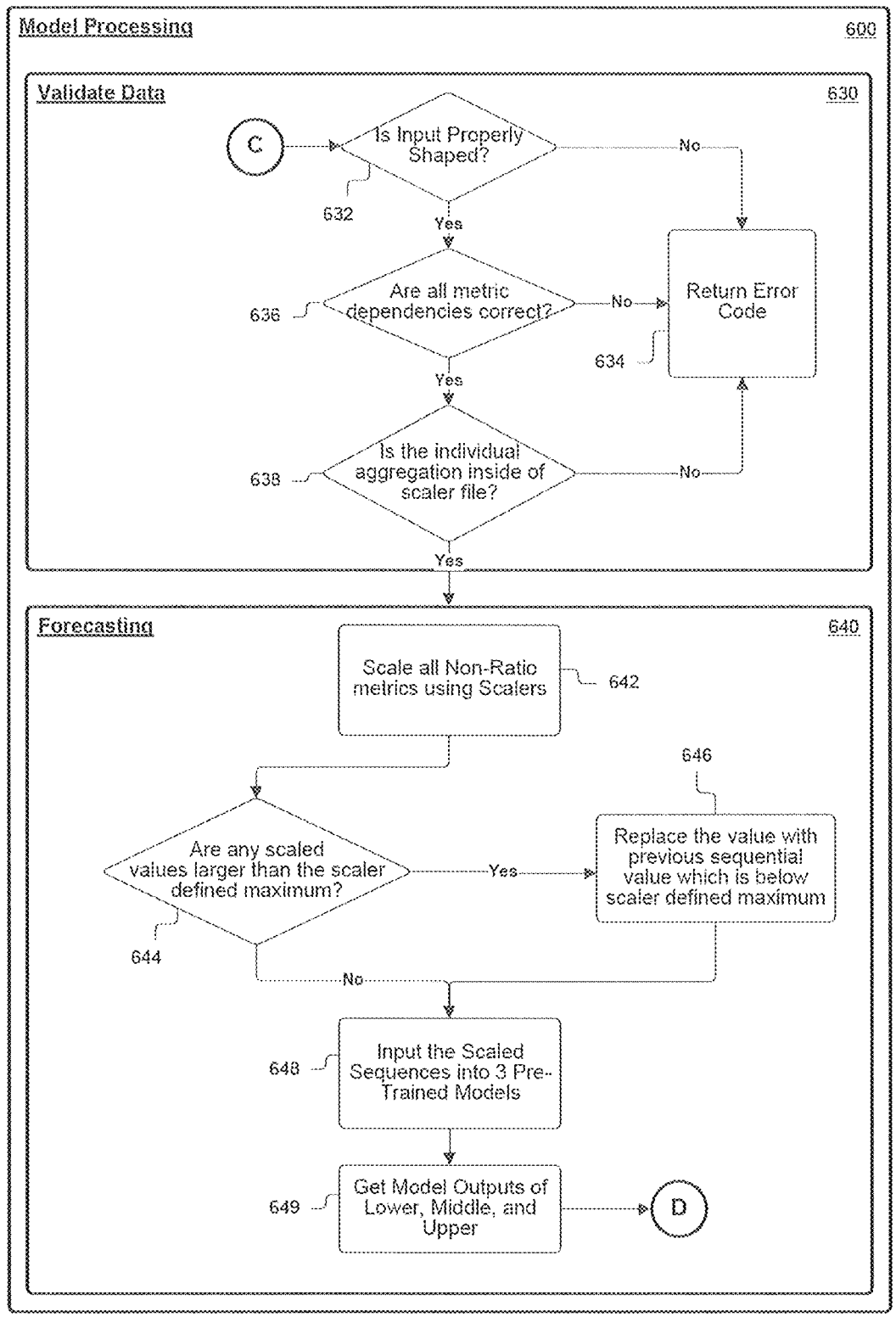
FIG. 8 is a flowchart illustrating operations for validating data and forecasting sub-functions within the model processing function in accordance with various embodiments of the present inventive concept.

As indicated by the circled C on FIG. 7, operations proceed to block 632 of FIG. 8. FIG. 8 is a flowchart illustrating operations for validating data (block 63) and forecasting sub-functions (block 640) within the model processing function(block 600) in accordance with various embodiments of the present inventive concept. Operations proceed to block 632 where it is determined if the input is shaped properly. In other words, is the input in a format ready to be used in the various systems, for example, a telecommunications system, scaled etc. If it is determined that the input is not shaped properly (block 632), operations proceed to block 634 where an error code is returned. Thus, the input can be reshaped or edited and then the validation process can be restarted at block 632. If it is determined that the input is shaped properly (block 632), operations proceed to block 636 where it is determined if all metric dependencies are correct. If it is determined that all metrics dependencies are not correct (block 636), operations proceed to block 634 where an error code is returned. Again, metric dependencies may be corrected and the validation process can be restarted. If it is determined that all metric dependencies are correct (block 636), it is determined if the individual aggregation is inside the scaler file (block 638). If it is determined that the individual aggregation is not inside the scaler file (block 638), operations proceed to block 634 where an error code is returned. Again, this may be corrected and the validation process may be restarted at block 632. If, on the other hand, it is determined that the individual aggregation is inside of the scaler file, operation proceeds to the forecasting function 640.

The forecasting function 640 begins at block 642 by scaling all non-ratio metrics using scalers. It is determined if any scaled values are larger than the scaler defined maximum (block 644). This is different from just looking at historical data. Patterns of traffic change and change quickly. Thus, this comparison helps deal with the frequent noise and change. If it is determined that the scaled values are larger than the scaler defined maximum (block 644), operations proceed to block 646 where the values are replaced with previous sequential values which are below the scaler defined maximum. Once the values are replaced (block 646) or it is determined that the scaled values are not larger than the scaler defined maximum (block 644), operations proceed to block 648 where the scaled sequences are input into three pre-trained models. For example, the three pre-trained machine learning models may be similar to the LSTM neural net as discussed above, however, embodiments of the present inventive concept are not limited thereto.

Obtain outputs of the three pretrained models, lower, middle and upper quantiles (block 649). The operations proceed to block 652 of FIG. 9 as indicated by the circled D (D-D).

Figure 9:
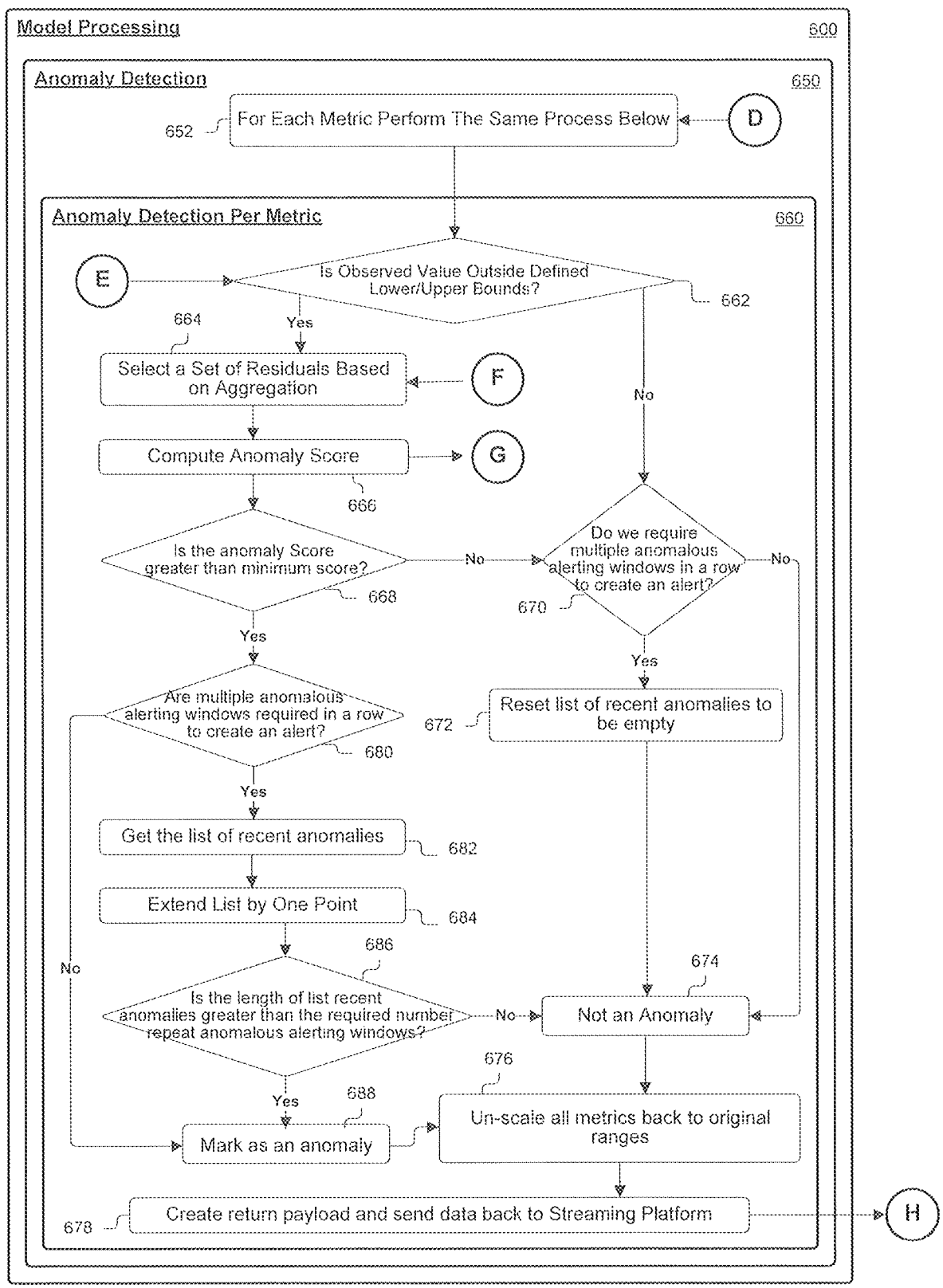
FIG. 9 is a flowchart illustrating operations for anomaly detection sub-functions within the model processing function in accordance with various embodiments of the present inventive concept.

Referring now to FIG. 9, a flowchart illustrating operations for anomaly detection sub-functions (block 650) within the model processing function (block 600) in accordance with various embodiments of the present inventive concept will be discussed. As illustrated in FIG. 9, operations proceed to block 652 where, for each metric, anomaly detection is performed. Operations for anomaly detection per metric (block 660) begin at block 662 where it is determined if the observed values are outside defined lower and upper thresholds.

Figure 10:
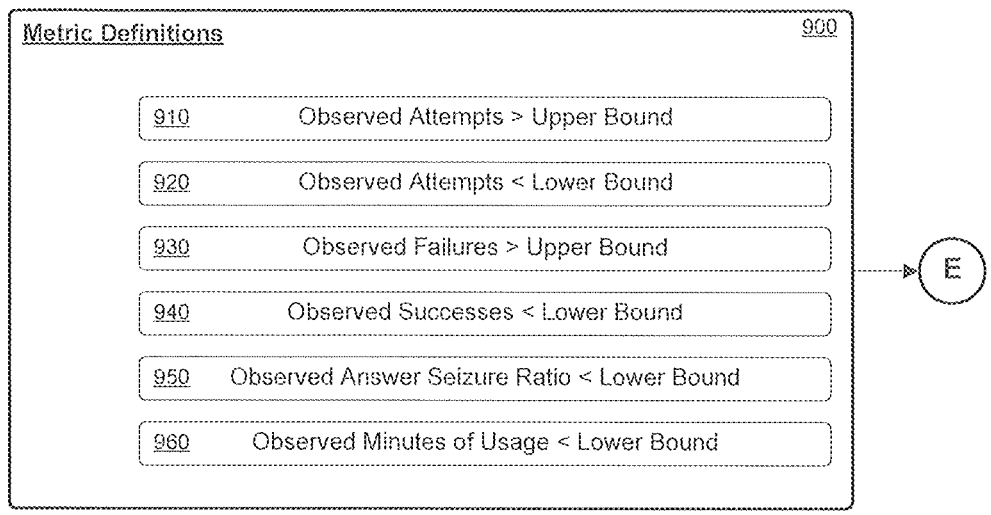
FIG. 10 is a illustrates metric definitions used in accordance with various embodiments of the present inventive concept.

As illustrated in FIG. 10 of the present application, the metric definitions 900 are used to aid in the determination of block 662 of FIG. 9. This is indicated by the circled E in FIG. 9. Referring briefly to FIG. 10, various metric definitions 900 used in accordance with various embodiments of the present inventive concept are illustrated therein. For example, the definitions included in FIG. 10 include: observed attempts>upper bound (910); observed attempts<lower bound (920); observed failures>upper bound (block 930); observed successes<lower bound (940); observed answer seizure ratio<lower bound (950); and observed minutes of usage<lower bound (block 960). For example, for observed successes, if the number of successful call attempts observed for an individual aggregation is 300, and the lower bound produced by the model for that same time period is 700, the anomaly detection would determine this to be a potential successful call anomaly, as the number of successes observed is lower than the lower bound predicted. It will be understood that these definitions in FIG. 10 are provided as an example only and embodiments of the present inventive concept are not limited thereto. These various definitions are configurable by a user.

Referring again to FIG. 9, it will be understood that many of the operations of FIG. 9 receive inputs and provide inputs from/to other flowcharts discussed herein. For example, block 664 receives input F from FIG. 12 and block 666 provides input G to FIG. 13. The details with respect to these inputs will be discussed with respect to their respective flowcharts.

As illustrated in FIG. 9, if it is determined that the observed value is outside the defined lower/upper bounds/thresholds (block 662), operations proceed to block 664 where a set of residuals are selected based on aggregation and an anomaly score is computed (block 666). As illustrated, details with respect to computation of residuals is discussed with respect to FIG. 12, circle F. Furthermore, details of computing the anomaly score will be discussed with respect to FIG. 13, circled G. It is determined if the anomaly score is greater than the minimum score (block 668). If it is determined that the anomaly score is greater than the minimum (block 668), operations proceed to block 680 where it is determined if multiple anomalous alerting windows are required in a row to create an alert. If it is determined that multiple anomalous alerting windows are not required (block 668), operations proceed to block 688 and an anomaly is declared. Operations then proceed to block 676, which will be discussed further below.

If it is determined that multiple anomalous alerting windows are required (block 680), operations proceed to block 682 where a list of recent anomalies is acquired and the list is extended by one point (block 684). It is determined if the length of the list of recent anomalies greater than the number of required anomalous alerting windows (block 686). If it is determined that the length of the list of recent anomalies is not greater than the number of required anomalous alerting windows, operations proceed to block 674 and it is determined not to be an anomaly. If it is determined that the length of the list of recent anomalies is greater than the number of required anomalous alerting windows, an anomaly is declared (block 688).

Returning back to blocks 662 and 668, if the observed value is determined not to be outside defined upper/lower limits (block 662) or it is determined that the anomaly score is not greater than the minimum score (block 668), operations proceed to block 670 where it is determined if multiple anomalous alerting windows in a row are required to create an alert. If multiple anomalous alerting windows are not required (block 670), no anomaly is declared (block 674). If it is determined that multiple anomalous windows are required (block 670), operations proceed to block 672 where the list of anomalies is reset to empty and an anomaly is not declared (block 674).

Once an anomaly is declared (block 688) or not declared (block 674), all metrics are unscaled back to their original ranges (block 676) and a return payload is created to send back to the streaming platform (H-H) (block 678).

Referring now to FIG. 11, a flowchart illustrating operations for computing residuals 800 in accordance with various embodiments of the present inventive concept will be discussed. As illustrated therein, for each tracked aggregation (block 502), retrieve six (6) months of data for each metric aggregated into alerting windows (block 812). For each individual aggregation that has greater than 95 percent of all alerting window with a non-zero amount of CDRs (block 814), preprocess the data into a sequential format that is expected by the model (block 822) for each metric (block 824).

At the beginning of each dataset (block 832), forecast one point ahead using the sequence leading up to the current alerting window. It is determined if every time bin in the dataset has been forecasted (block 836). If it is determined that not every time bin has been forecasted (block 836), operations return to block 834 until it is determined that every time bin has been forecasted. If it is determined that every time bin has been forecasted (block 836), a difference between a forecasted point and an observed value for each alerting window is calculated (block 838). A standard deviation of the set of all differences is calculated (block 839).

Figure 12:
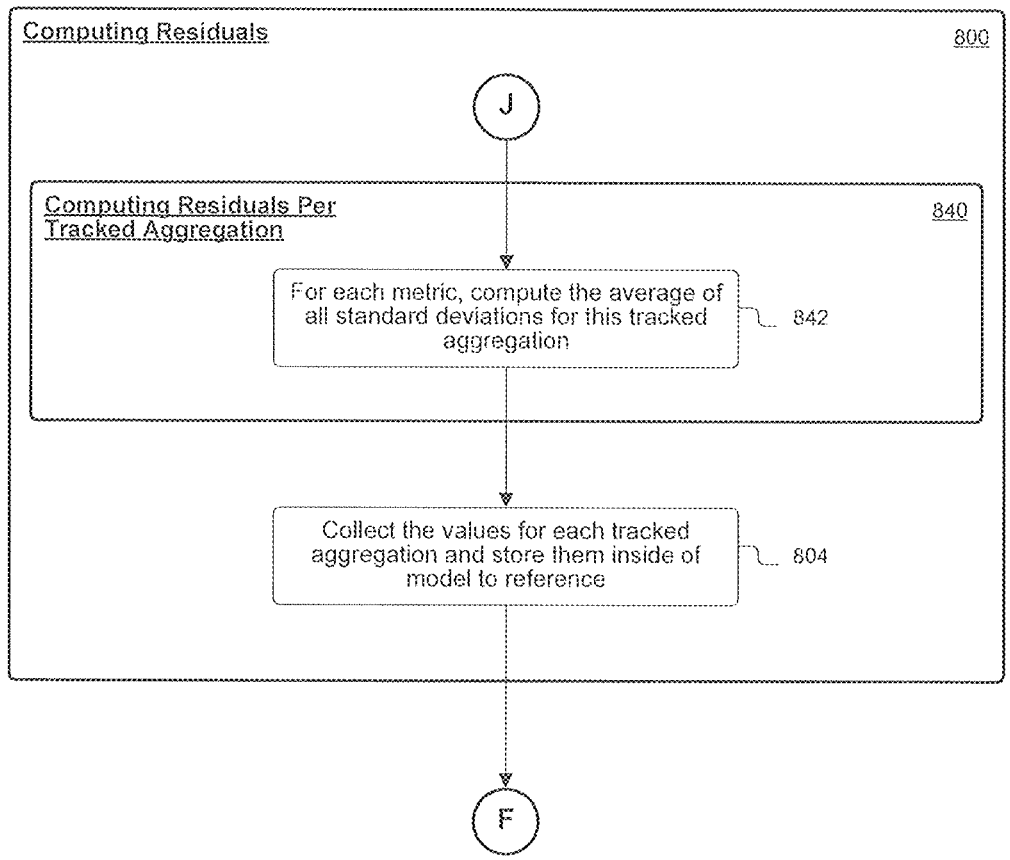
FIG. 12 is a further flowchart illustrating operations for computing residuals in accordance with various embodiments of the present inventive concept.

As shown in FIG. 12, operations proceed to block 842 and, for each metric, a n average of all standard deviations for this tracked aggregation is computed. The values for each tracked aggregation are collected and stored inside the model for reference.

Figure 13:
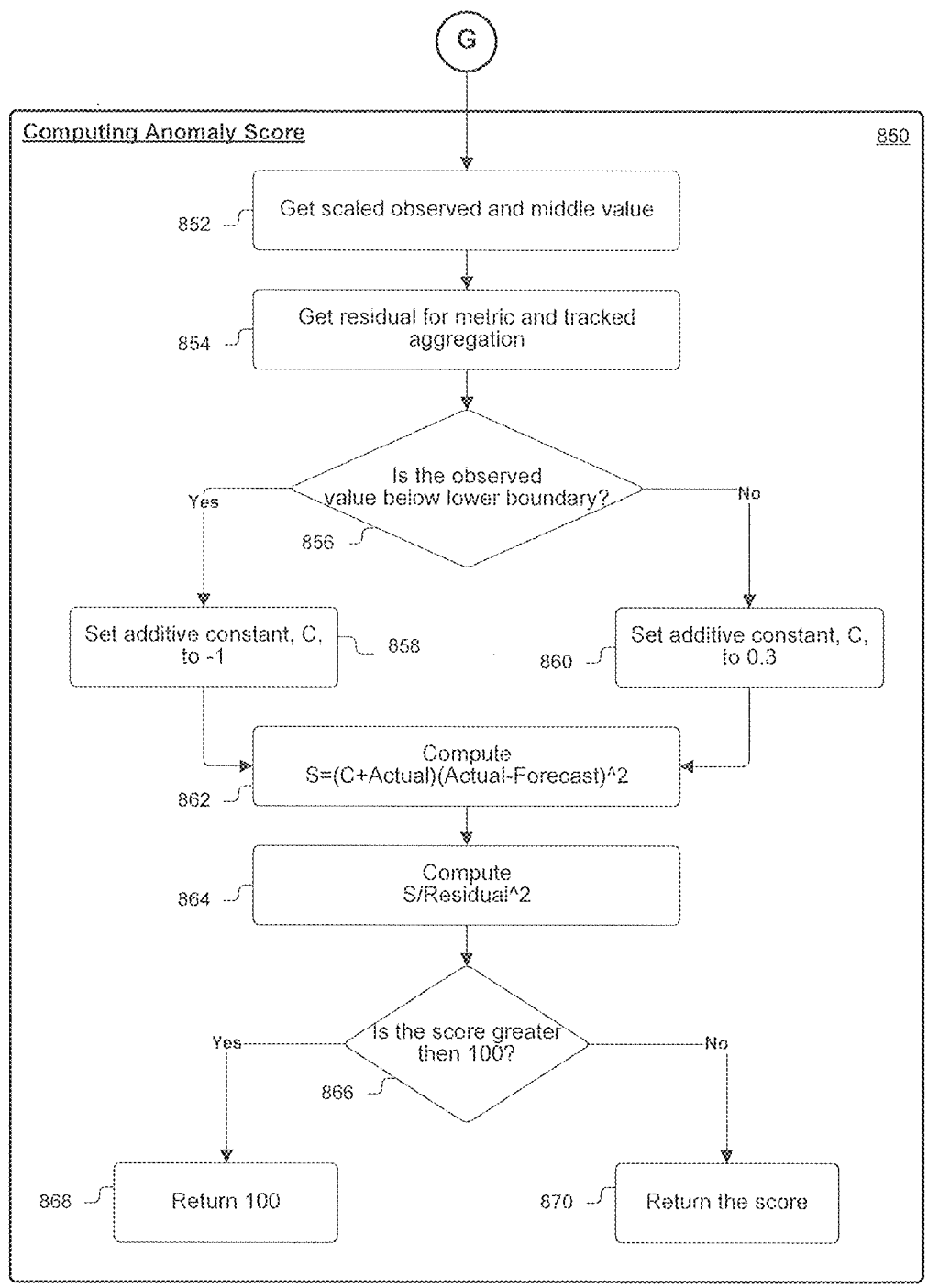
FIG. 13 is a flowchart illustrating operations for computing an anomaly score in accordance with various embodiments of the present inventive concept.

Referring now to FIG. 13, a flowchart illustrating operations for computing an anomaly score in accordance with various embodiments of the present inventive concept will now be discussed. As illustrated, operations begin at block 852 by receiving the scaled observed and middle quantiles (G-G) as shown in FIG. 9. Retrieve residual metric and tracked aggregation (block 854). It is determined if the observed value is below a lower boundary (block 856). If it is determined that the observed value is below the lower boundary, an additive constant (C) is set to "−1" (block 858). If, on the other hand, it is determined that the observed value is not below the lower boundary (block 856), the additive constant C is set to "0.3" (block 860).

Once the additive constant is set, operations proceed to block 862 where the following equation is executed:

$$S = (C + Actual)(Actual - Forecast)^2 \qquad \text{Eqn. (1)}$$

where S is the score, C is the constant, Actual is the actual observed value and Forecast is the forecasted value.

Operations proceed to block 864 where the following equation is computed:

$$S/Residual^2 \qquad \text{Eqn. (2)}$$

It is then determined if the score (S) is greater than 100 (block 866). If the score is greater than 100, 100 is returned (block 868). If the score is less than 100, the score is returned (block 870).

Figure 14:
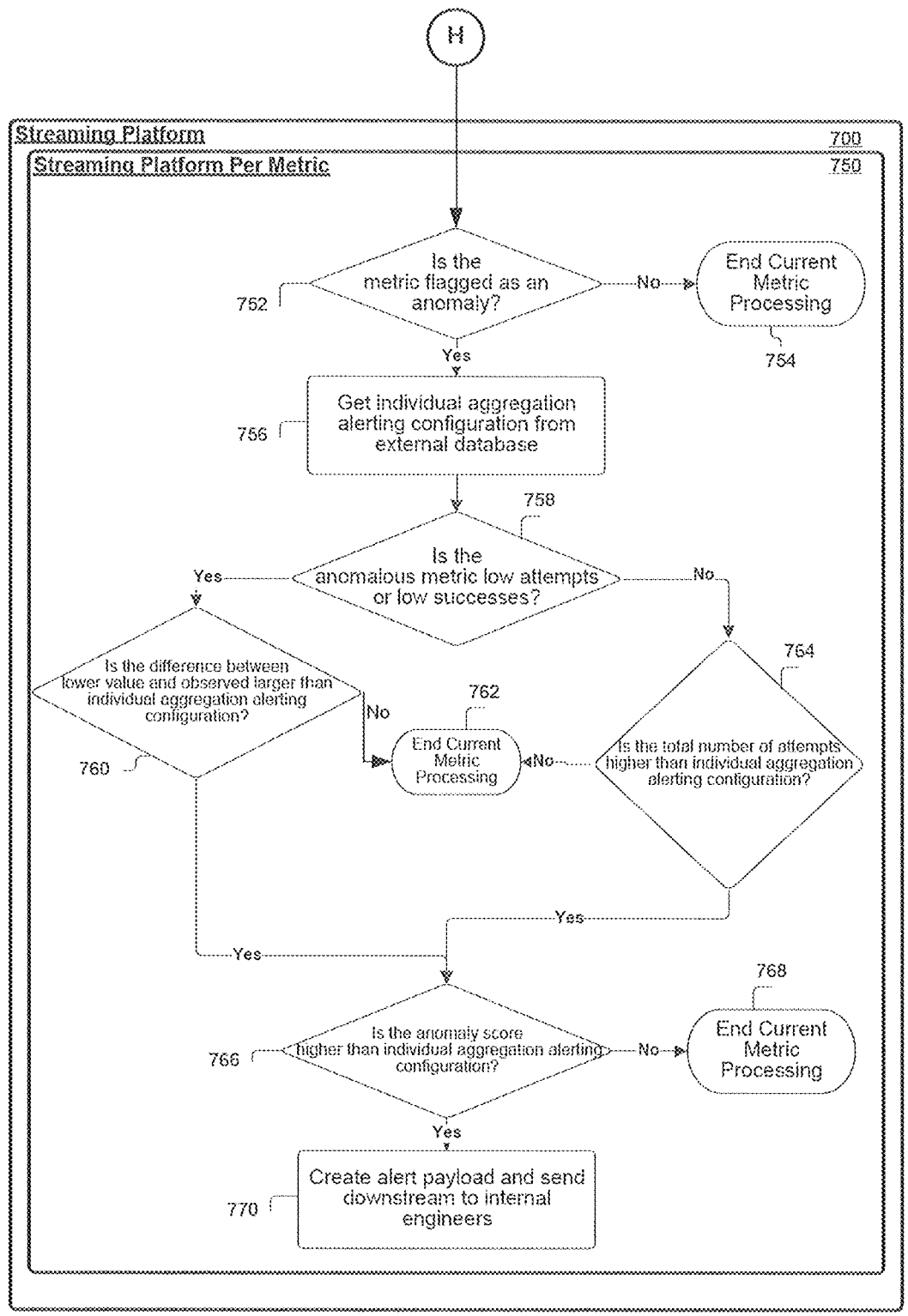
FIG. 14 is a flowchart illustrating operations for a streaming platform for determining whether to send an alert of an anomalous condition in accordance with various embodiments of the present inventive concept.

Referring now to FIG. 14, a flowchart illustrating operations for a streaming platform 700 for determining whether to send an alert of an anomalous condition in accordance with various embodiments of the present inventive concept. As illustrated, block 752 received the data from the model processing function 600 shown in FIG. 9. It is determined if the metric flagged is an anomaly (block 752). If it is determined that the metric flagged is not an anomaly (block 752), the metric processing is ended (block 754). If it is determined that the flagged metric is an anomaly (block 752), individual aggregation alerting configurations are obtained from the external database (block 756). It is determined if the anomalous metric is low attempts or low successes (block 758). If it is determined that the anomalous metric is not low attempts or low successes (block 758), it is determined if the total number of attempts higher than the individual aggregation alerting configuration (block 764). If the total number of attempts is not higher, the current metric process is ended (block 762). If, on the other hand it is determined that the total number of attempts is higher (block 764), operations proceed to block 766.

Referring back to block 758, if it is determined that the anomalous metric is low attempts or low successes, it is determined if the difference between the lower value and the observed value is larger than individual aggregation alerting window (block 760). If it is not larger, the current metric process is ended (block 762). If, on the other hand, it is determined that the difference is larger (block 760), operations proceed to block 766 where it is determined if the anomaly score is higher than the individual aggregation alerting configuration. If the anomaly score is not higher, operations proceed to block 768 and the metric processing is ended. If, on the other hand, it is determined that the anomaly score is higher (block 766), an alert payload is created and sent downstream to, for example, the internal engineers.

It will be understood that the process discussed with respect to FIG. 14 may be performed manually or may be automated or may be a combination of both without departing from the scope of the present inventive concept. Furthermore, any remedy addressing the identified anomaly may be processed by, for example, engineers, and changes may be made responsive thereto.

FIGS. 1-14 discussed in detail above describe techniques and data processing that may be used to monitor a host telecommunications network for anomalies. These techniques may be tailored to focus on a variety of use cases and specific anomalies. One example anomaly will be discussed below with respect to FIGS. 15-17, however, it will be understood that embodiments discussed herein are not limited to this example.

Figure 15:
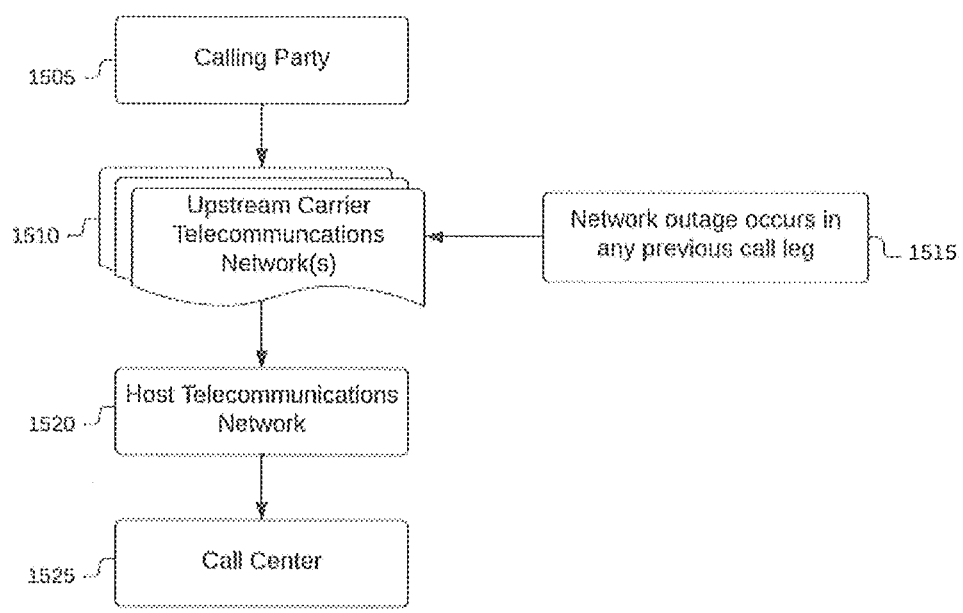
FIG. 15 is a block diagram illustrating, from a network architecture perspective, where a problem affecting inbound toll-free call traffic may occur in accordance with some embodiments of the present inventive concept.
Figure 16:
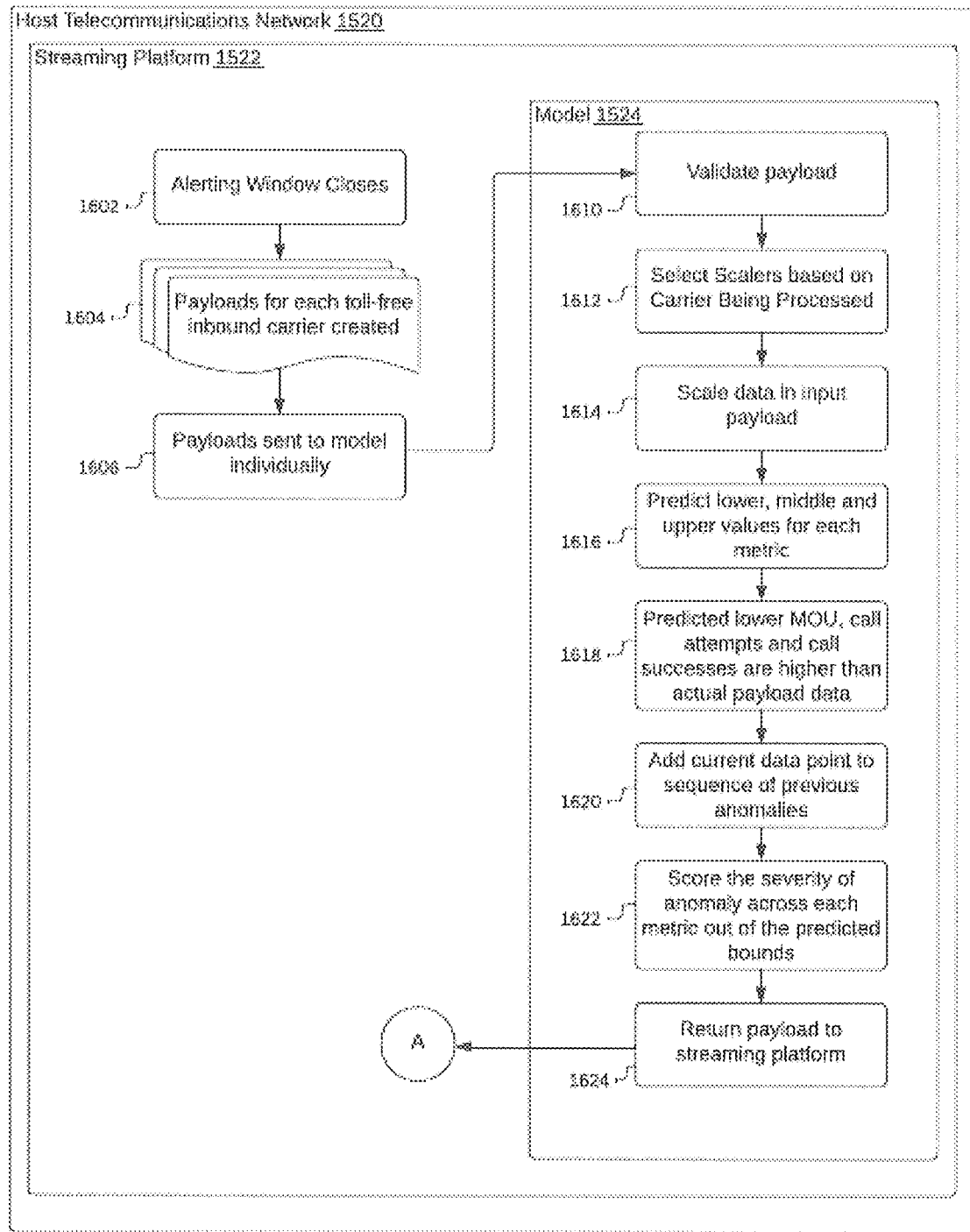
FIG. 16 is a flowchart illustrating how the techniques and model discussed herein are applied to discover inbound call traffic anomalies discussed in FIG. 15 in accordance with some embodiments of the present inventive concept.
Figure 17:
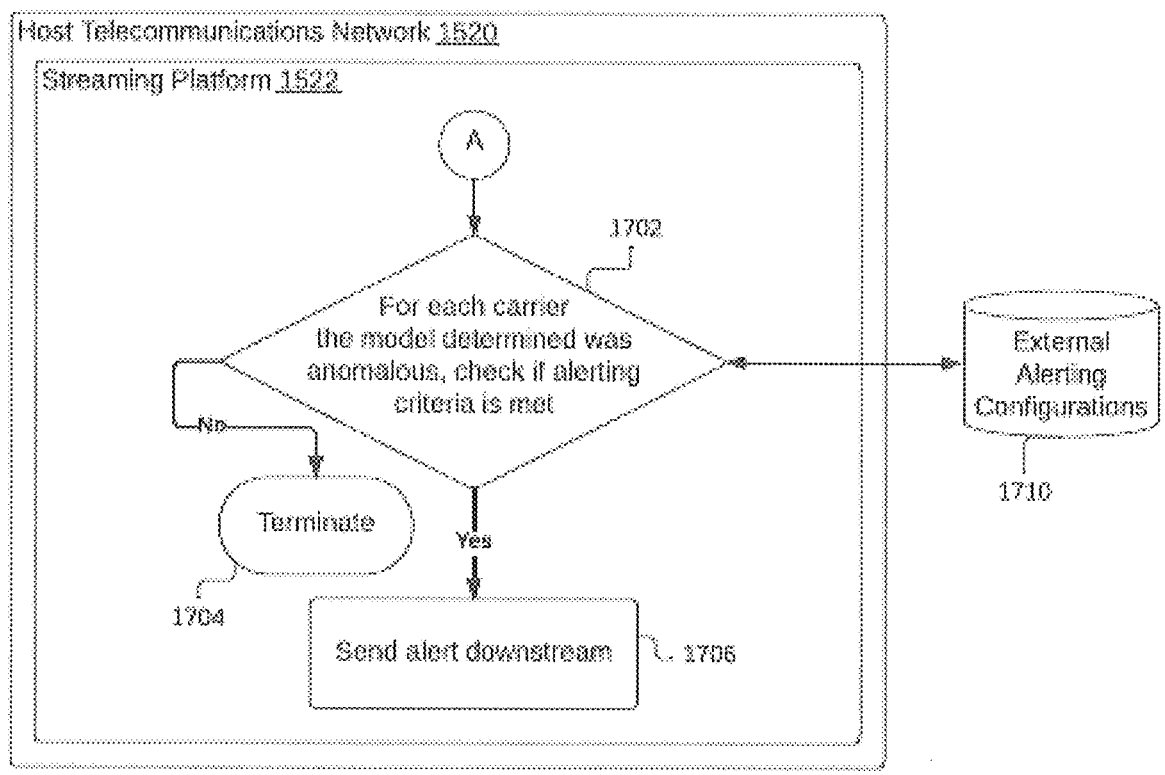
FIG. 17 is a flowchart illustrating how the monitoring systems of the host telecommunications network respond to any anomalies detected by methods discussed with respect to FIG. 16 in accordance with some embodiments of the present inventive concept.

As will be discussed below with respect to FIGS. 15-17, the techniques and model discussed above may be applied to discover inbound call traffic anomalies to a toll-free call center. In particular, FIG. 15 is a block diagram illustrating, from a network architecture perspective, where a problem affecting inbound toll-free call traffic may occur. FIG. 16 is a flowchart illustrating how the techniques and model discussed herein may be applied to discover inbound call traffic anomalies similar to those discussed with respect to FIG. 15. FIG. 17 is a flowchart illustrating how the monitoring systems of the host telecommunications network may respond to any anomalies detected by the methods discussed in FIG. 16.

Referring first to FIG. 15, consider that a toll-free call center receives inbound calling services from a telecommunications carrier. If the toll-free call center experiences anomalous traffic patterns for inbound calling traffic from a particular upstream carrier, the anomal(ies) may be detected and reported using the techniques and model discussed herein. In these embodiments, operations begin at block 1505 by the calling party placing a call intended for a call center 1525. The call from the calling party may be routed through one or more upstream carrier external telecommunication networks 1510 as discussed above. Generally, calls intended for call center 1525 will be routed to and through a host telecommunications network 1520 on its path the call center 1525. However, at any given time, any of the upstream carriers 1510 may be experiencing network difficulties 1515 that may impact call traffic into or out of the upstream carrier's network 1510. The upstream carrier 1510 problem(s) 1515 may cause anomalous traffic patterns in call center 1525.

Referring now to FIG. 16, the monitoring and gathering of data as discussed herein continuously occurs within the host telecommunications network 1520 that is servicing the toll-free call center. At the end of a given alerting window 1602 when an anomaly may be occurring, the streaming platform may collect all information for all upstream carriers regarding calls inbound to the toll-free call center in step 1604. This information may be processed by the streaming platform 722 (FIG. 6) within host telecommunications network 1520 servicing the toll-free call center to prepare a data payload to be sent to the model 724 (FIG. 6) (block 1604). The details are discussed above with respect to FIG. 6. The data payload is then validated (block 1610) after which a correct set of scalers are selected for the inbound traffic coming from the particular upstream carrier (block 1612). The data payload is scaled based on the selected scalars (block 1614). Operations proceed to block 1616, where the lower, middle, and upper predictions are forecasted using the scaled data payload. Details for some embodiments are discussed above with respect to FIG. 8.

Because there may currently be an anomaly with inbound traffic, the data output from the model will show that the predicted lower bounds for minutes of usage (MOU), call attempts, and call successes are higher than the actual MOU data, call attempts, and call successes as determined (block 1618). Such a result meets the criteria for a potential anomaly as discussed, for example, above with respect to FIG. 10. The potential anomaly is stored into the sequence of prior anomalies (block 1620), and is subsequently scored (block 1622) using the observed and predicted values, the sequence of prior anomalies for the inbound traffic from the particular upstream carrier, as well as the residuals for the upstream carrier. Details of some embodiments are discussed above with respect to FIG. 13. 13. The model 724 may return the payload data now tagged with an anomaly severity score to the streaming platform 722 (block 1624).

Referring now to FIG. 17, the model 724 checks an external database to ensure that all alerting criteria are met (block 1702). Details are discussed, for example, above with respect to FIG. 14. If the alerting criteria (block 1702) are not met, the process terminates (block 1704) and no notifications are deemed necessary. If, on the other hand, the criteria are satisfied (block 1702), an alert is produced and sent to engineers (block 1710) to begin remedial action against the particular upstream carrier, as well as contacting the toll-free call center (block 1706).

Figure 18:
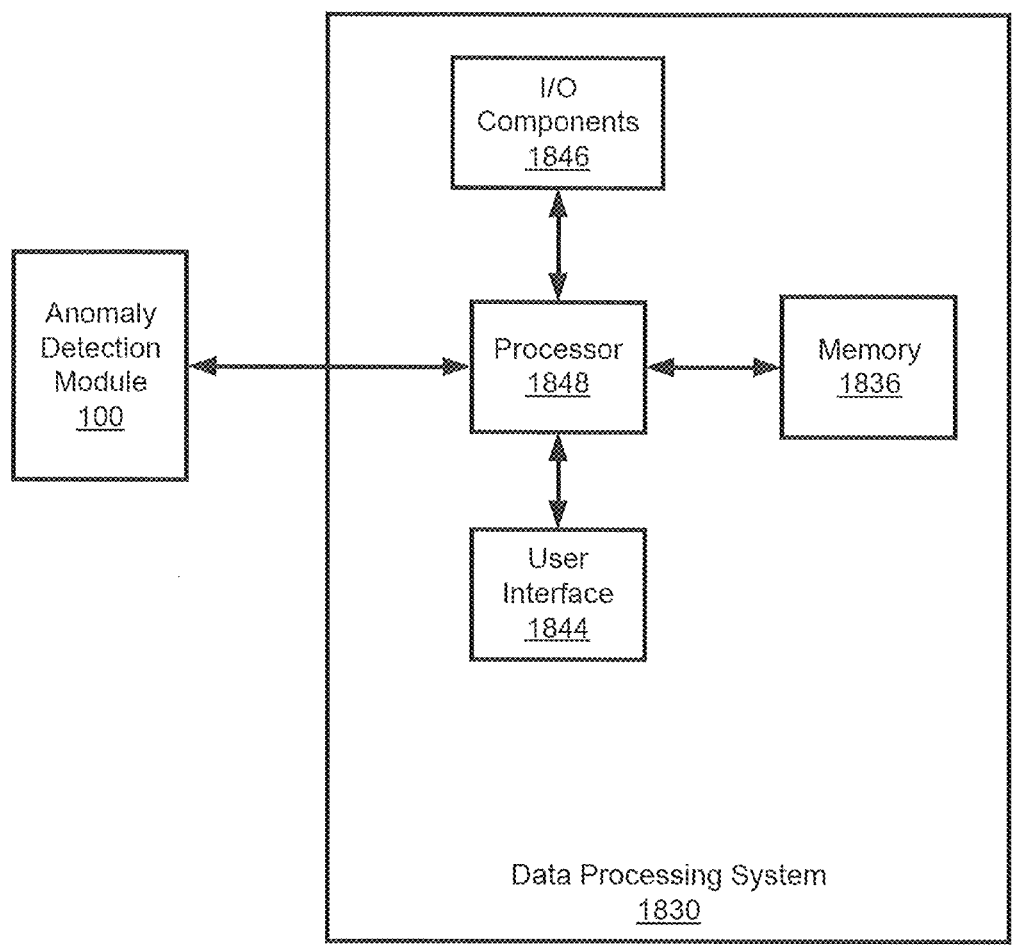
FIG. 18 is a block diagram of a data processing system for use in accordance with some embodiments of the present inventive concept.

Referring now to FIG. 18, an example of a data processing system 1830 suitable for use with any of the examples described above. Although the example data processing system 1830 is shown as in communication with the Anomaly Detection Module 100 in accordance with embodiments of the present inventive concept, the data processing system 1630 may also be part of the Anomaly Detection Module 100 or in any other component of the system 101 without departing from the scope of the present inventive concept. In some examples, the data processing system 1830 can be any suitable computing device for performing operations according to the embodiments discussed herein.

As illustrated, the data processing system 1830 includes a processor 1848 communicatively coupled to I/O components 1846, a user interface 1844 and a memory 1836. The processor 1848 can include one or more commercially available processors, embedded processors, secure processors, microprocessors, dual microprocessors, multi-core processors, other multi-processor architectures, another suitable processing device, or any combination of these. The memory 1836, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 1830.

I/O components 1846 may be used to facilitate wired or wireless connections to devices such as one or more displays, game controllers, keyboards, mice, joysticks, cameras, buttons, speakers, microphones and/or other hardware used to input or output data. Memory 1636 represents nonvolatile storages such as magnetic, optical, or other storage media included in the data processing system and/or coupled to processor 1848.

The user interface 1844 may include, for example, a keyboard, keypad, touchpad, voice activation circuit, display or the like and the processor 1848 may execute program code or instructions stored in memory 1836.

It should be appreciated that data processing system 1830 may also include additional processors, additional storage, and a computer-readable medium (not shown). The processor(s) 1648 may execute additional computer-executable program instructions stored in memory 1636. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

As briefly discussed above, some embodiments of the present inventive concept provide detection of anomalies in telecommunication traffic that may cause an abundant number of incomplete calls. One example of this type of anomaly is a large increase of inbound traffic to a toll-free number for, for example, a call center. As discussed above, when the alerting window closes, this data will be provided to the anomaly detection module and alerts related to this event may be created. For example, alerts may be provided to inbound toll-free carriers, invoice toll-free network devices and/or inbound toll-free call types and the like. Once these alerts are received, action may be taken to resolve the problem.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C #, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or nonerasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

That which is claimed is:

1. A method of identifying inbound call traffic anomalies in a telecommunications system, the method comprising: receiving expected values for data related to the telecommunications system, the data being associated with call detail records; for each metric in the received data, determining if an observed value is outside defined upper and lower thresholds; selecting a set of residuals based on an aggregation of data in the call detail records if the observed value is outside the defined upper and lower thresholds; un-scaling all metrics back to original ranges, if the observed value is within the predefined upper and lower threshold; computing an anomaly score based the selected set of residuals; determining if multiple, serial anomalous alerting windows are needed to create an alert if the computed anomaly score is greater than a minimum anomaly score; un-scaling all metrics if the computed anomaly score is not greater than the minimum anomaly score; and declaring that the data supports an anomaly in the inbound call traffic if it is determined that multiple, serial anomalous alerting windows are not needed to create an alert.

2. The method of claim 1, wherein it is determined that multiple, serial anomalous alerting windows are needed to create an alert, the method further comprising:
obtaining a list of recent inbound traffic anomalies;
extending the obtained list by a factor of 1;
determining if a length of the extended list is greater than a number of serial, anomalous alerting windows needed to create an alert; and
declaring that the data supports an anomaly in the inbound call traffic if it is determined that the extended list is greater than the number of serial, anomalous alerting windows needed to create an alert.

3. The method of claim 2, wherein selecting a set of residuals is preceded by:
obtaining six months of data for each metric aggregated into alerting windows;
for each individual aggregation that has greater than 95 percent of all alerting windows with a non-zero amount of call detail records, preprocessing the data into a sequential format recognized by a model for each metric;
forecasting one point ahead using a sequence leading up to a current alerting window;
repeat forecasting until every time bin in the data has been forecasted;
computing a difference between a forecasted point and an observed value for each alerting window;
computing a standard deviation over a set of all computed differences;
for each metric, computing an average of all standard deviations for tracked aggregations;
collecting values for each tracked aggregation; and
storing the values for use as residuals by the model.

4. The method of claim 1, wherein computing the anomaly score for the inbound call traffic based the selected set of residuals comprises:
obtaining scaled observed and middle values;
obtaining residual for metric and tracked aggregation;
determining if the observed value is below a lower boundary;
setting an additive constant to −1.0 if the observed value is below the lower boundary and setting the additive constant to 0.3 if the observed value is greater than the lower boundary;
computing the anomaly score based on the value of the additive constant; and
returning an anomaly score of 100 if the computed score is greater than 100 and returning the computed score as the anomaly score if the computed score is less than 100.

5. The method of claim 1, wherein the defined upper and lower thresholds include one or more of observed attempts>upper bound; observed attempts<lower bound; observed failures>upper bound; observed successes<lower bound; observed answer seizure ratio<lower bound; and observed minutes of usage<lower bound.

6. The method of claim 1, wherein declaring that the data supports an anomaly in the inbound call traffic is followed by creating an alert related to the anomaly.

7. The method of claim 6, further comprising implementing a remedial process associated with the alerted anomaly.

8. The method of claim 1, wherein the expected value corresponds to at least one of a lower, middle and upper quantile of expected values.

9. At least one non-transitory machine-readable medium comprising a set of instructions executable on at least one computing device to cause the at least one computing device to perform identification of inbound call traffic anomalies in a telecommunications system, the set of instructions to: receive expected values for data related to the telecommunications system, the data being associated with call detail records; for each metric in the received data, determine if an observed value is outside defined upper and lower thresholds; un-scaling all metrics back to original ranges, if the observed value is within the predefined upper and lower threshold; select a set of residuals based on an aggregation of data in the call detail records if the observed value is outside the defined upper and lower thresholds; compute an anomaly score based the selected set of residuals; determine if multiple, serial anomalous alerting windows are needed to create an alert if the computed anomaly score is greater than a minimum anomaly score; un-scaling all metrics if the computed anomaly score is not greater than the minimum anomaly score; and declare that the data supports an anomaly in the inbound call traffic if it is determined that multiple, serial anomalous alerting windows are not needed to create an alert.

10. The at least one non-transitory machine-readable medium of claim 9, wherein it is determined that multiple, serial anomalous alerting windows are needed to create an alert and wherein the set of instructions further cause the processor to:
 obtain a list of recent anomalies in the inbound call traffic;
 extend the obtained list by a factor of 1;
 determine if a length of the extended list is greater than a number of serial, anomalous alerting windows needed to create an alert; and
 declare that the data supports an anomaly in the inbound call traffic if it is determined that the extended list is greater than the number of serial, anomalous alerting windows needed to create an alert.

11. The at least one non-transitory machine-readable medium of claim 10, wherein the set of instructions further cause the processor to:
 obtain six months of data for each metric aggregated into alerting windows;
 for each individual aggregation that has greater than 95 percent of all alerting windows with a non-zero amount of call detail records, preprocess the data into a sequential format recognized by a model for each metric,
 forecast one point ahead using a sequence leading up to a current alerting window;
 repeat the forecasting until every time bin in the data has been forecasted;
 compute a difference between a forecasted point and an observed value for each alerting window;
 compute a standard deviation over a set of all computed differences;
 for each metric, compute an average of all standard deviations for tracked aggregations;
 collect values for each tracked aggregation; and
 store the values for use as residuals by the model.

12. The at least one non-transitory machine-readable medium of claim 9, wherein the set of instructions to compute the anomaly score further cause the processor to:
 obtain scaled observed and middle values;
 obtain residual for metric and tracked aggregation;
 determine if the observed value is below a lower boundary;
 set an additive constant to −1.0 if the observed value is below the lower boundary and set the additive constant to 0.3 if the observed value is greater than the lower boundary;
 compute the anomaly score based on the value of the additive constant; and
 return an anomaly score of 100 if the computed score is greater than 100 and returning the computed score as the anomaly score if the computed score is less than 100.

13. The at least one non-transitory machine-readable medium of claim 9, wherein the defined upper and lower thresholds include one or more of observed attempts>upper bound; observed attempts<lower bound; observed failures>upper bound; observed successes<lower bound; observed answer seizure ratio<lower bound; and observed minutes of usage<lower bound.

14. The at least one non-transitory machine-readable medium of claim 9, wherein the set of instructions further cause the processor to create an alert related to the declared anomaly in the inbound call traffic.

15. A computer system for identifying inbound call traffic anomalies in a telecommunications system, the computer system comprising: one or more memories; one or more processors, communicatively coupled to the one or more memories, the one or more processors configured to: receive expected values for data related to the telecommunications system, the data being associated with call detail records; for each metric in the received data, determine if an observed value is outside defined upper and lower thresholds; un-scaling all metrics back to original ranges, if the observed value is within the predefined upper and lower threshold; select a set of residuals based on an aggregation of data in the call detail records if the observed value is outside the defined upper and lower thresholds; compute an anomaly score based the selected set of residuals; determine if multiple, serial anomalous alerting windows are needed to create an alert if the computed anomaly score is greater than a minimum anomaly score; un-scaling all metrics if the computed anomaly score is not greater than the minimum anomaly score; and declare that the data supports an anomaly in the inbound call traffic if it is determined that multiple, serial anomalous alerting windows are not needed to create an alert.

16. The computer system of claim 15, wherein it is determined that multiple, serial anomalous alerting windows are needed to create an alert and wherein the one or more processors are further configured to:
 obtain a list of recent anomalies in the inbound call traffic;
 extend the obtained list by a factor of 1;
 determine if a length of the extended list is greater than a number of serial, anomalous alerting windows needed to create an alert; and
 declare that the data supports an anomaly if it is determined that the extended list is greater than the number of serial, anomalous alerting windows needed to create an alert.

17. The computer system of claim 16, wherein the one or more processors are further configured to:
 obtain six months of data for each metric aggregated into alerting windows;
 for each individual aggregation that has greater than 95 percent of all alerting windows with a non-zero amount of call detail records, preprocess the data into a sequential format recognized by a model for each metric,
 forecast one point ahead using a sequence leading up to a current alerting window;
 repeat the forecasting until every time bin in the data has been forecasted;
 compute a difference between a forecasted point and an observed value for each alerting window;

compute a standard deviation over a set of all computed differences;

for each metric, compute an average of all standard deviations for tracked aggregations;

collect values for each tracked aggregation; and store the values for use as residuals by the model.

18. The computer system of claim 15, wherein the one or more processors to compute the anomaly score are further configured to:

obtain scaled observed and middle values;

obtain residual for metric and tracked aggregation;

determine if the observed value is below a lower boundary;

set an additive constant to −1.0 if the observed value is below the lower boundary and set the additive constant to 0.3 if the observed value is greater than the lower boundary;

compute the anomaly score based on the value of the additive constant; and return an anomaly score of 100 if the computed score is greater than 100 and returning the computed score as the anomaly score if the computed score is less than 100.

19. The computer system of claim 15, wherein the defined upper and lower thresholds include one or more of observed attempts>upper bound; observed attempts<lower bound; observed failures>upper bound; observed successes<lower bound; observed answer seizure ratio<lower bound; and observed minutes of usage<lower bound.

20. The computer system of claim 15, the one or more processors are further configured to create an alert related to the declared anomaly in the inbound call traffic.

* * * * *